US010073881B2

(12) United States Patent
Look et al.

(10) Patent No.: US 10,073,881 B2
(45) Date of Patent: Sep. 11, 2018

(54) PLATFORM FOR AUTHORING, STORING, AND SEARCHING WORKFLOWS

(71) Applicant: Autodesk, Inc., San Rafael, CA (US)

(72) Inventors: Douglas Look, San Francisco, CA (US); Gonzalo Rubio, Montevideo (UY); Arindam Ganguly, San Rafael, CA (US); John Wallace, Ithaca, NY (US); Adam Arnold, Orinda, CA (US)

(73) Assignee: AUTODESK, INC., San Rafael, CA (US)

( * ) Notice: Subject to any disclaimer, the term of this patent is extended or adjusted under 35 U.S.C. 154(b) by 279 days.

(21) Appl. No.: 15/173,557

(22) Filed: Jun. 3, 2016

(65) Prior Publication Data
US 2017/0024436 A1 Jan. 26, 2017

Related U.S. Application Data

(60) Provisional application No. 62/195,235, filed on Jul. 21, 2015.

(51) Int. Cl.
G06F 17/30 (2006.01)
H04L 29/06 (2006.01)
(Continued)

(52) U.S. Cl.
CPC .. *G06F 17/30389* (2013.01); *G06F 17/30554* (2013.01); *G06F 17/30873* (2013.01);
(Continued)

(58) Field of Classification Search
CPC ......... G06F 17/30389; G06F 17/30554; G06F 17/30873; G06Q 10/06; G06Q 10/103; H04L 67/42
(Continued)

(56) References Cited

U.S. PATENT DOCUMENTS 7,076,728 B2 * 7/2006 Davis ............... G06F 17/243
709/220
8,146,017 B2 * 3/2012 Malek ............... G06Q 10/06
707/602
(Continued)

FOREIGN PATENT DOCUMENTS

WO WO 2006/124268 A2 * 11/2006 ............. G06F 17/30

OTHER PUBLICATIONS

Demuth, Bastian et al., "The UNICORE Rich Client: Facilitating the Automated Execution of Scientific Workflows", e-Science 2010, Brisbane, QLD, Australia, Dec. 7-10, 2010, pp. 238-245.*
(Continued)

Primary Examiner — Robert Stevens
(74) Attorney, Agent, or Firm — Artegis Law Group, LLP

(57) ABSTRACT

An authoring platform for authoring a client workflow includes an arrangement of shapes representing steps and connections representing relationships between the steps. Online content retrieved from an online resource may be associated with steps of the client workflow. An authoring service receives the client workflow from the client interface via a network and directs a graph database to store a database workflow corresponding to the client workflow. A search platform is provided for creating and searching workflows using a tag database taxonomy. An author creates a workflow wherein a tag is linked to a workflow item. The workflow is stored as a database workflow and a node in the database workflow representing the workflow item is linked to a node in the database taxonomy representing the tag. Multiple workflows are created in a similar manner to link the workflows to the database taxonomy to provide efficient searching of the workflows.

20 Claims, 16 Drawing Sheets

(51) Int. Cl.
*G06Q 10/06* (2012.01)
*G06Q 10/10* (2012.01)

(52) U.S. Cl.
CPC ........... *G06Q 10/06* (2013.01); *G06Q 10/103* (2013.01); *H04L 67/42* (2013.01)

(58) Field of Classification Search
USPC ......................................................... 707/770
See application file for complete search history.

(56) References Cited

U.S. PATENT DOCUMENTS

| | | | | |
|---|---|---|---|---|
| 2002/0133516 A1* | 9/2002 | Davis | ................... | G06F 17/243 715/205 |
| 2003/0200527 A1* | 10/2003 | Lynn | ...................... | G06Q 10/06 717/102 |
| 2003/0233372 A1* | 12/2003 | Warner | ............... | G06F 17/3089 |
| 2004/0068424 A1* | 4/2004 | Lee | .................. | G06Q 10/06311 705/7.15 |
| 2005/0086588 A1* | 4/2005 | McGregor | ............. | G06Q 10/06 715/221 |
| 2005/0234964 A1* | 10/2005 | Batra | ...................... | H04L 67/16 |
| 2006/0074730 A1* | 4/2006 | Shukla | ................... | G06Q 10/06 705/7.27 |
| 2006/0074733 A1* | 4/2006 | Shukla | ...................... | G06F 8/10 717/105 |
| 2007/0240037 A1* | 10/2007 | Law-How-Hung | ......................... | G06F 17/3089 715/234 |
| 2007/0245300 A1* | 10/2007 | Chan | ...................... | G06Q 10/06 717/105 |
| 2008/0115195 A1* | 5/2008 | Malek | .................... | G06Q 10/06 726/4 |
| 2014/0012802 A1* | 1/2014 | Huber | ...................... | G06F 8/35 707/608 |
| 2015/0363555 A1* | 12/2015 | Studsrud | ............... | G06F 19/327 705/2 |
| 2016/0103871 A1* | 4/2016 | Zheng | ............... | G06F 17/30563 707/766 |
| 2016/0103898 A1* | 4/2016 | Zheng | ............... | G06F 17/30563 707/602 |
| 2016/0358102 A1* | 12/2016 | Bowers | ................ | G06N 99/005 |
| 2016/0358103 A1* | 12/2016 | Bowers | ................ | G06N 99/005 |

OTHER PUBLICATIONS

Kinghorn, Jay, "Metadata: Today's Workflow, Tomorrow's Automation?", Professional Digital Workflow, RGB Imaging, Boulder, CO, © 2007, 3 pages.*

* cited by examiner

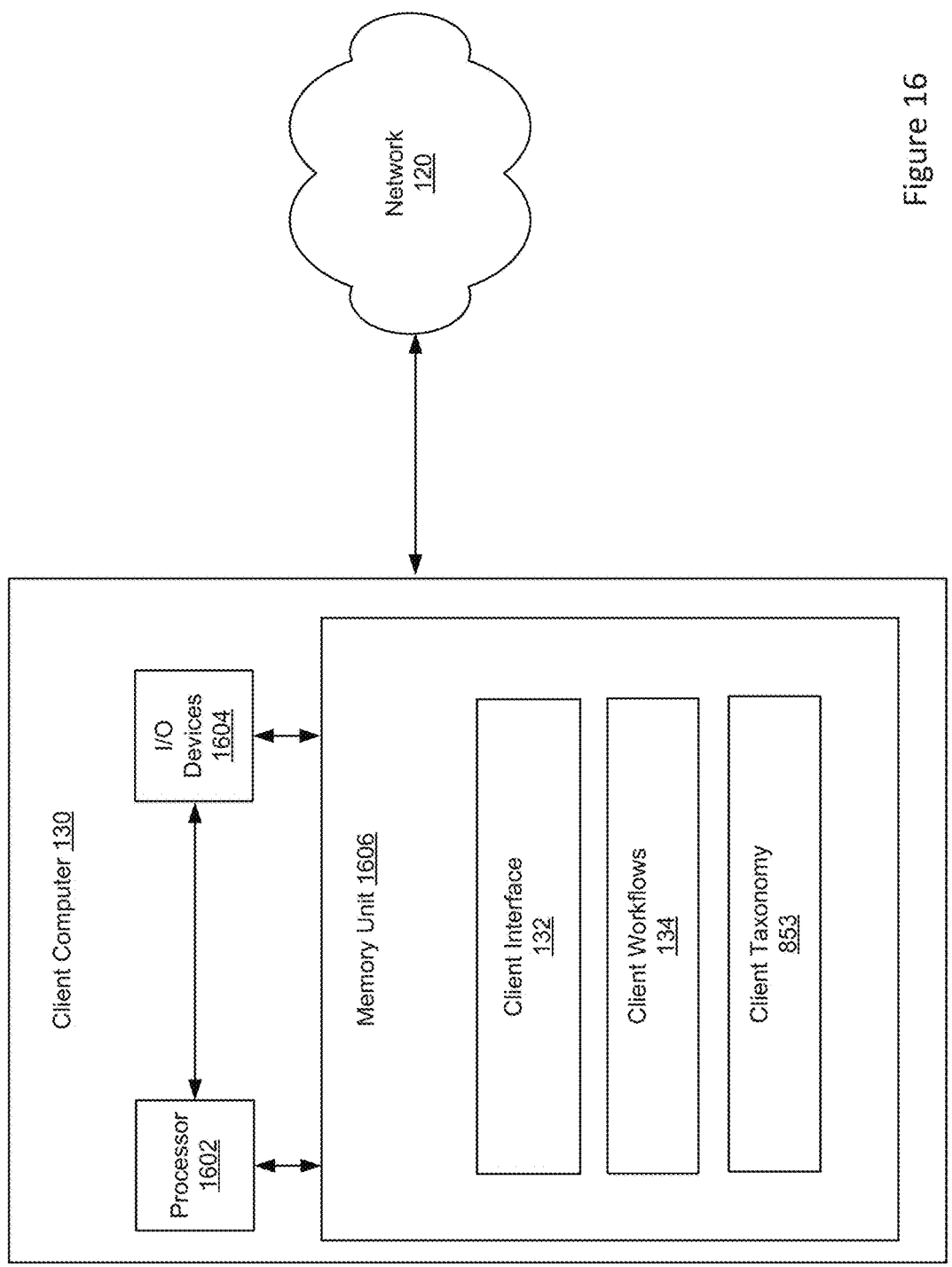

PLATFORM FOR AUTHORING, STORING, AND SEARCHING WORKFLOWS

CROSS-REFERENCE TO RELATED APPLICATIONS

Field of the Invention

This application claims the benefit of U.S. provisional patent application 62/195,235, filed on Jul. 21, 2015. The subject matter of this related application is hereby incorporated herein by reference.

BACKGROUND OF THE INVENTION

Field of the Invention

The present invention generally relates to computer science and, more specifically, to a platform for authoring, storing, and searching workflows.

Description of the Related Art

The complexity of some software applications makes the learning curve with respect to those software applications very steep. In order to improve efficiency and software product familiarity, past efforts have been made to create user workflows that provide guidance and instructions to users for solving the specific problems being worked on by users with the software or for achieving certain goals or outcome with the software. A workflow may describe, for example, a sequence of steps and functions a user can execute to solve a particular problem or achieve a particular goal. In some cases, a workflow may be represented graphically, with geometric shapes representing the different steps and functions of the workflow that need to be taken by the user. Thus, workflows are very effective tools for providing users with quick visual understandings of the overall steps that need to be taken to solve certain problems or to achieve certain goals.

One drawback of conventional workflows, however, is that the workflows typically include only a limited amount of description and content for the different steps depicted within the workflow. For example, a workflow may include only a title for a particular step and/or a brief textual description of the step. A further drawback is that conventional workflows are not captured and retained in a way that allows large numbers of workflows to be easily stored and retrieved. An additional drawback is that conventional workflows are not organized or related in ways that allow easy searching of relevant workflows to allow workflows to be easily shared among users. Because of the problems surrounding storing and retrieving workflows and relating workflows to one another, many workflows generated by past users are not shared with current users, which results in substantial inefficiencies by forcing current users to "recreate the wheel" when using complex software applications.

As the foregoing illustrates, there is a need in the art for more effective ways to author, store, and search workflows.

SUMMARY OF THE INVENTION

Various embodiments include a computer-implemented method for authoring a workflow. The method includes receiving, at a server computer, a client workflow comprising an arrangement of shapes and connections. Each shape represents a step of the client workflow and each connection represents a relationship between two steps of the client workflow. The method also includes generating, at the server computer, a set of database queries for producing a database workflow corresponding to the client workflow. The database workflow comprises an arrangement of step nodes and step edges, each step node representing a step of the client workflow and each step edge representing a relationship between two steps of the client workflow. The method further includes sending the set of database queries to a graph database for execution.

At least one advantage of the disclosed technique is that it enables authoring of workflows that may include a wide range of content, including online content. Another advantage of the disclosed technique is that it enables efficient storing and searching of a large number of workflows using a graph database.

Various embodiments include a computer-implemented method for searching workflows. The method includes receiving, at a server computer, a search tag. The method also includes producing, at the server computer, a set of database queries for performing a search within a graph database based on the search tag. The graph database stores a plurality of workflows and a tag taxonomy, each workflow including a plurality of workflow item nodes and the tag taxonomy including a plurality of tag nodes representing a plurality of tags. The method further includes sending the set of database queries to the graph database for execution.

At least one advantage of the disclosed technique is that fast and efficient searches of a large number of workflows linked to a taxonomy of tags may be performed.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 16 illustrates an example client computer of FIGS. 1 and 8, according to various embodiments.

DETAILED DESCRIPTION

Figure 1:
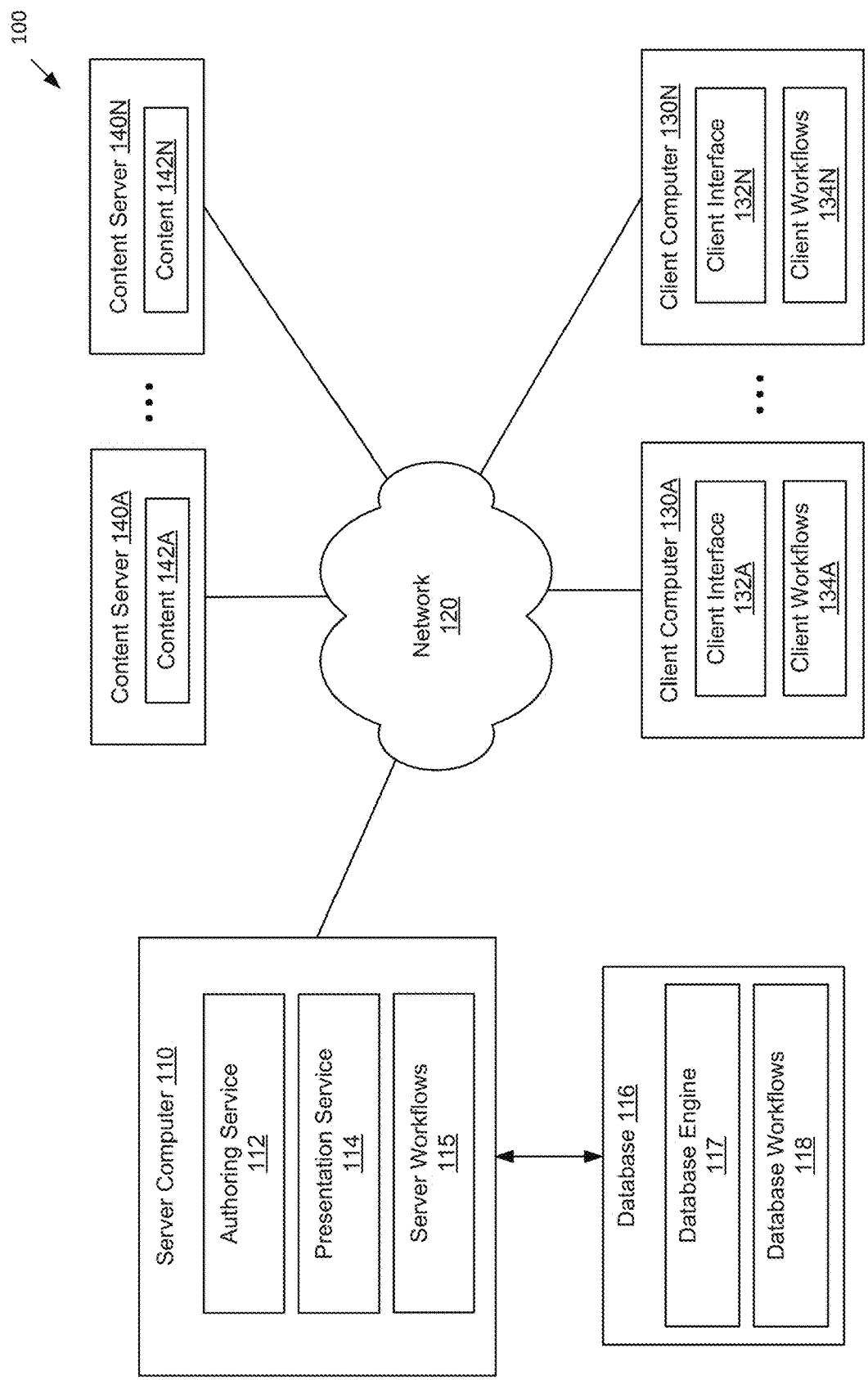
FIG. 1 illustrates an authoring platform environment configured to implement one or more aspects of the present invention.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The following description is divided into two sections. Section I describes a platform for authoring and storing workflows using a graph database. Section II describes a platform for searching workflows using a graph database.

Section I: Platform for Authoring and Storing Workflows

Users of a given software product may wish to create workflows that augments the documentation created by the provider of the software application. Such users are generally referred to as authors. A workflow may provide valuable insight for both novice and experienced users for solving particular problems or achieving particular goals related to the software application. For example, a workflow may be created to illustrate a process for editing images in a photo editor application. In other embodiments, a workflow may be produced for any type of process, whether related to a software application or not. For example, a workflow may be created to illustrate a process for changing oil in an automobile, setting up a home theater system, writing a thesis paper, etc. As used herein, a workflow comprises a sequence or series of connected steps for performing a particular process (which solves a particular problem or achieves a particular goal). A step of a workflow may comprise any operation, function, task, or the like. A process of a workflow may comprise any method, procedure, algorithm, or the like. A workflow may comprise a graphical/visual diagram that represents the process. A workflow diagram comprises an arrangement of geometric shapes and connections, the geometric shapes representing steps of the workflow and the connections representing relationships between the steps. In general, a workflow may comprise any process that can be represented by a graphical flow diagram.

Typically a workflow includes only a limited amount of description for each step of the workflow, such as a title and a brief text description of the step. Embodiments described herein provide an authoring platform for creating workflows that may include a wide range of content, including digital online content. In these embodiments, online content may be associated with one or more steps of the workflow. Workflows created using the authoring platform may be efficiently stored to a graph database. A workflow may be created by an author via a web-based user interface executing on a client computer that connects to a server computer which manages the graph database. The server computer may act as an interface between the client computer and the graph database by receiving the workflow (and associated content) from the client computer and managing and directing the storage of the workflow to the graph database. Each workflow may be stored to the graph database as a graph structure comprising an arrangement of nodes and edges, the nodes representing steps of the workflow and the edges representing relationships between the steps. A workflow that is created by the authoring platform may be later retrieved from the graph database and displayed at the client computer. Thus, the authoring platform may comprise a web-based platform for creating and retrieving workflows including a wide range of content that is connected in the back-end to a graph database.

Authoring and Storing Environment

FIG. 1 illustrates an authoring platform environment 100 configured to implement one or more aspects of the present invention. The authoring platform environment 100 enables authoring and storing of workflows to a graph database. As shown, the environment 100 includes at least one client computer 130 (e.g., 130A-130N), a server computer 110, and at least one content server 140 (e.g., 140A-140N) coupled via a network 120. Each of client computer 130, server computer 110, and content server 140 may comprise computer hardware components such as memory for storing software application(s) and data and processors that execute the software application(s) to provide processing engines that enable the inventive operations and functions described herein. The computer hardware components of the server computer 110 and client computer 130 are discussed below in relation to FIGS. 15-16. In this regard, each client computer 130 hosts and executes a client interface engine 132, the server computer 110 hosts and executes an authoring service engine 112 and a presentation service engine 114. The server computer 110 is also coupled to a graph database 116 comprising a database engine 117 that organizes and stores database workflows 118.

As shown in FIG. 1, the client computer 130, server computer 110, and the graph database 116 each stores (e.g., in memory or storage) a separate and distinct version/representation of a workflow. For example, each client computer 130 stores a client workflow 134 that is created by an author, the server computer 110 stores a corresponding server workflow 115 that is an internal server representation of the client workflow 134, and the graph database 116 stores a corresponding database workflow 118 that is a graph database representation of the client workflow 134 In some embodiments, a client workflow 134 may comprise a displayed artifact (displayed in the client interface 132 at the client computer 130) having underlying data records in the Scalable Vector Graphics (SVG) XML image format and comprise a Javascript object in a memory of the client computer 130. In some embodiments, a server workflow 115 may comprise an internal abstract representation/model of the client workflow 134 that exists in a memory of the server computer 110 in the form of a Javascript object. A database workflow 118 may comprise a compact persistent/permanent record of the client workflow 134 in the form of nodes, relationships, and property records (as well as database artifacts such as indexes and constraints). The database workflow 118 may also exist in an expanded form in a memory of the server computer 110 when the database engine 117 is activated, whereby the form of the database workflow 118 is configured to provide an optimal performance database environment after the expansion. In general, the database workflow 118 may comprise a persistent/permanent record of a workflow, whereas a server workflow 115 may comprise a temporary "working copy" of a workflow which is revealed by database queries.

Each different version of the workflow may comprise a different data format and syntax that is appropriate for the computing device on which the workflow version is stored. In general, the client workflow 134 is understandable and executable by the client interface 132 residing on the client computer 130 and is not understandable and executable by the database engine 117 residing on the database 116. Similarly, the database workflow 118 is understandable and executable by the database engine 117 residing on the database 116 and is not understandable and executable by the client interface 132 residing on the client computer 130. The authoring service 112 residing on the server computer 110 may produce a server workflow 115 to assist translations between a client workflow 134 on the client computer 130 and a corresponding database workflow 118 on the database 116. As used herein, a "workflow item" comprises a workflow or any element or component of a workflow, including the overall workflow, a step, a shape or node representing a step, a relationship between steps, a connection or edge representing a relationship, associated content, and a node representing associated content.

An author/user may interact with a client interface 132 executing on the client computer 130 to create and/or modify a client workflow 134. The client interface 132 may comprise a combined web-browser and workflow editor application. The client interface 132 may include any workflow editor that is capable of creating and/or modifying a graphical diagram that represents a workflow via an arrangement of connected geometric shapes (discussed in relation to FIG. 2). The web-browser application of the client interface 132 includes a software plug-in that allows the web-browser to interact with the service engines of the server computer 110 (such as authoring service engine 112 and a presentation service engine 114). The author/user may interact with the client interface 132 to create geometric shapes representing steps of the workflow and connections between the geometric shapes representing the relationships between the steps to produce the client workflow 134. Each shape/step may have associated metadata, such as a title and/or brief description of the shape/step. In some embodiments, the author/user may also associate a wide range of online content (such as content 142 from a content server 140) with the client workflow 134 or any step of the client workflow 134 (discussed in relation to FIG. 3). In these embodiments, a client workflow 134 may comprise a graphical diagram that represents a workflow as well as any associated content. The client interface 132 then sends client payloads representing the user interactions with the client workflow 134 to the authoring service 112 residing on the server computer 110. Each client payload may comprise a set of client requests and client metadata representing the user interactions with the client workflow 134.

The authoring service 112 comprises application logic or server API that resides and executes on the server computer 110. The authoring service 112 receives a client payload representing the user interactions for a client workflow 134 to produce an internal abstract representation/model of the client workflow 134 (referred to herein as a server workflow 115). In general, the authoring service 112 may produce the server workflow 115 to assist translations between the client workflow 134 on the client computer 130 and a corresponding database workflow 118 on the database 116. Based on the received client payload and the internal server workflow 115, the authoring service 112 produces a set of database query statements that cause and direct the database engine 117 of the database 116 to store the client workflow 134 as a graph structure (referred to herein as a database workflow 118).

In some embodiments, the database 116 comprises a graph database that stores a client workflow 134 as a graph structure comprising an arrangement of nodes and edges. A node of the graph structure may represent the workflow, a particular step of the workflow, or associated content. Each node may have associated metadata, such as a title and/or brief description of the node. An edge comprises a connection between two nodes and represents a specific relationship between the two nodes. When receiving a set of database queries from the authoring service 112, the database engine 117 executes the database queries to store the client workflow 134 as a graph structure (database workflow 118). The database engine 117 may store each client workflow 134 as a separate database workflow 118 in the database 116.

An author/user may initially interact with the client interface 132 to create a new client workflow 134 and input text descriptors (e.g., a title and/or a brief description) for the new client workflow 134. The client interface 132 sends a client payload representing the user interactions to the authoring service 112 which creates a new server workflow 115 for the client workflow 134 and generates a set of database queries to direct the database engine 117 to create a new database workflow 118 (comprising a node representing the new database workflow 118 and associated metadata for the text descriptors). The database engine 117 executes the query statements and produces and stores a new database workflow 118 to the database 116.

After creating the new client workflow 134, the user may continue to interact with the client interface 132 to modify the client workflow 134. For example, the user may add, remove, or edit the steps, relationships between the steps, or associated content of the client workflow 134. After receiving each user interaction/modification of the client workflow 134, the client interface 132 sends a client payload representing the user interaction/modification to the authoring service 112 which modifies the server workflow 115 to reflect the modifications to the client workflow 134 according to the received client payload. In addition, based on the received client payload and the modifications to the server workflow 115, the authoring service 112 generates a set of database query statements that directs the database engine 117 to modify the database workflow 118 to likewise reflect the modifications to the client workflow 134. The database engine 117 receives and executes the query statements to modify the database workflow 118 accordingly.

In some embodiments, user interactions/modification to the client workflow 134 automatically causes corresponding/equivalent modifications to the corresponding database workflow 118 in real-time. In particular, each user interaction with the client workflow 134 automatically causes the client interface 132 to send a client payload (representing the user interaction) to the authoring service 112 in real-time. Upon receiving the client payload, the authoring service 112 automatically modifies the corresponding server workflow 115 and produces database queries to modify the corresponding database workflow 118 in real-time. Thus, each user interaction/modification to the client workflow 134 automatically causes corresponding/equivalent modifications to database workflow 118 that is stored persistently in the database 116, without requiring the user to request saving/storing the modified client workflow 134 to the database 116.

As described above, the authoring service 112 translates the received client payload from the client interface 132 to a set of database query statements that is understandable and executable by the database engine 117. The client payload from the client interface 132 may comprise a set of client requests that are understandable and executable by a workflow editor application of the client interface 132 for creating or modifying a client workflow 134. The client requests from the client interface 132 are typically not executable by a database engine 117 of a graph database 116. Thus, the authoring service 112 may act as an intermediary to translate the client requests from the client interface 132 to a set of database query statements that is understandable and executable by the database engine 117.

As described above, each client workflow 134 may be stored to the graph database 116 as a graph database workflow 118 with nodes (representing steps) and edges (representing relationships between the steps). Given the inherent structural similarity of a client workflow diagram 134 (comprising geometric shapes representing steps and connections representing relationships between the steps) and a graph database workflow 118 (comprising nodes representing steps and edges representing relationships between the steps), a graph database 118 enables efficient storage, organization, and retrieval of client workflows 132. Furthermore, a graph database 116 enables efficient relationship linking between workflows and quick searching of a large number of workflows (discussed below in Section II).

A client workflow 132 that is created by the authoring platform 100 and stored to the database 116 as a corresponding database workflow 118 may be later retrieved from the database 116 and displayed at a client interface 132. A database workflow 118 stored to the database 116 may be accessed by any client computer 130 executing a client interface 132 via the network 120 (assuming the user has access permissions). Thus, the authoring platform 100 enables web-based access to database workflows 118 that allows broad collaboration and distribution of the database workflows 118 to any users (having access permission) across the web.

In general, when retrieving a database workflow 118 for display, the client interface 132 connects and communicates with (via the network 120) a presentation service engine 114 residing on the server computer 110. A user may submit a request for a particular database workflow 118 through the client interface 132 which sends the request to the presentation service 114. In response, the presentation service 114 sends a database query statement to the database engine 117 for the requested database workflow 118. In response, the database engine 117 sends a graph representation of the requested database workflow 118. For example, the graph representation may comprise a JavaScript Object Notation (JSON) representation comprising a list of nodes and edges comprising the requested database workflow 118. The presentation service 114 then translates the graph representation of the requested database workflow 118 to a client representation of the requested database workflow 118 that is understandable by the client interface 132. The client interface 132 then receives and displays the client representation of the database workflow 118 as a client workflow 134.

Authoring and Storing Workflows to a Graph Database

Figure 2:
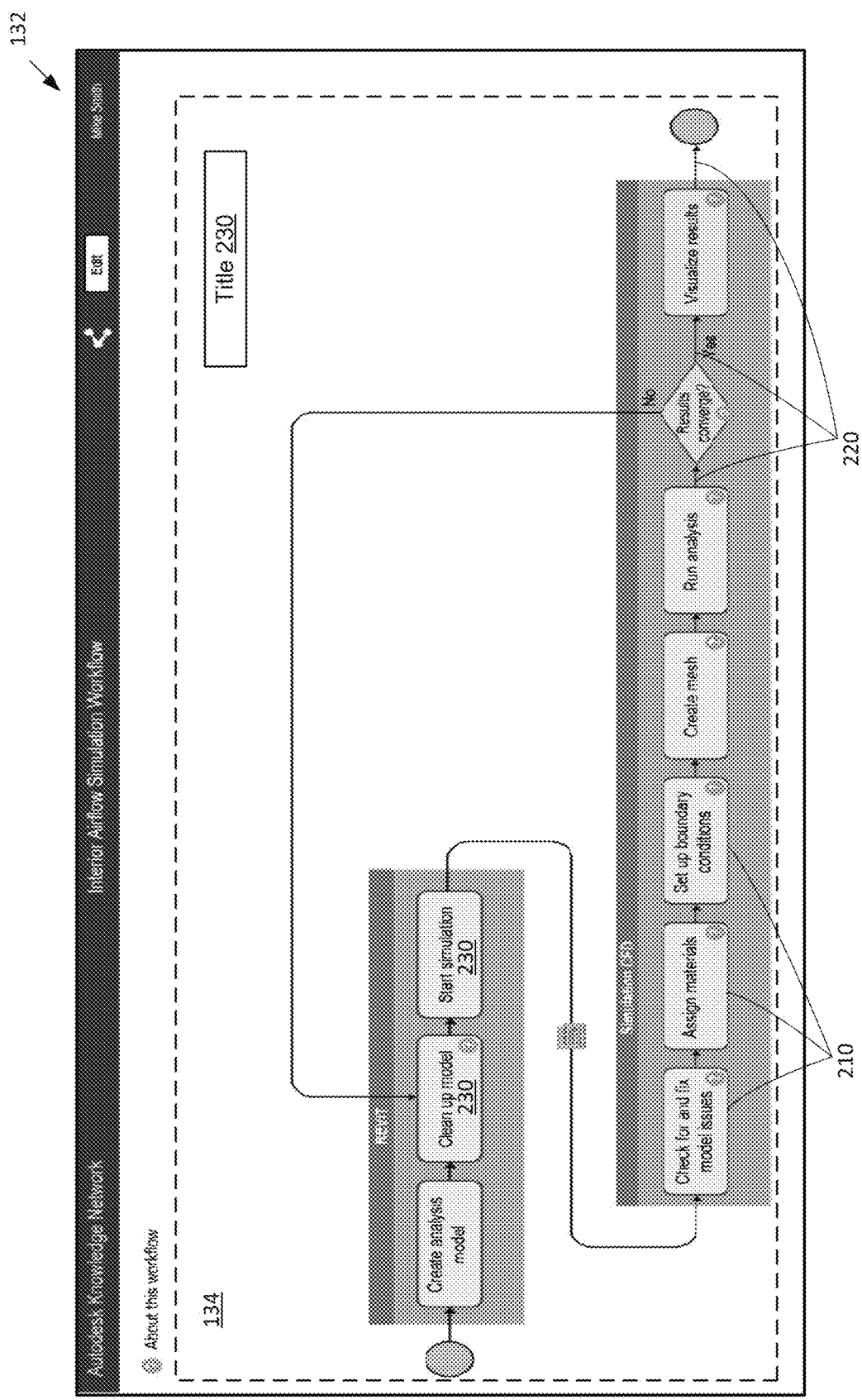
FIG. 2 illustrates a screenshot of a client interface for authoring a client workflow, according to various embodiments.

FIG. 2 illustrates a screenshot of a client interface 132 for authoring a client workflow 134, according to various embodiments. The client interface 132 may comprise a workflow editor application capable of creating and/or modifying a client workflow 134. The client workflow 134 may comprise any graphical diagram that represents a workflow.

As used herein, a workflow comprises a sequence or series of connected steps for performing a particular process. A step of a workflow may comprise an operation, function, task, or the like. A process may comprise a method, procedure, algorithm, or the like. A workflow may comprise a graphical/visual diagram that represents the process as an arrangement of connected geometric shapes 210. Each geometric shape 210 in the diagram may represent a step of the workflow. A workflow may comprise different types of steps, such as a terminal step (e.g., start or end), process step (where something is performed), or decision step (e.g., where a decision is made resulting in a Yes/No or True/False decision). Each different type of step may be represented by a different type of geometric shape 210. For example, a terminal step may be represented by an oval or rounded rectangle, a process step may be represented by a rectangle, a decision step may be represented by a rhombus.

Each connection 220 in the workflow diagram connects two geometric shapes 210 (representing two steps of the workflow) and indicates the sequential relationship between the two steps within workflow. Thus, the connections 220 between geometric shapes 210 may indicate the sequence/ordering of steps of the workflow (such as a first step that precedes a second step and a third step that follows the second step). Each connection 220 may be graphically/visually represented by an arrow indicating the sequence/ordering of the two connected shapes/steps 210.

An author/user may interact with the client interface 132 (executing on the client computer 130) to create and/or modify a client workflow 134. For example, the user may initially interact with the client interface 132 to create a new client workflow 134 and input text descriptors 230 (e.g., a title and/or a brief description) for the new client workflow 134. Creating a new client workflow 134 in the client interface 132 automatically causes a new database workflow 118 to be produced and stored in the database 116. After creating the new client workflow 134, the user may continue to interact with the client interface 132 to modify the client workflow 134. For example, the user may add, remove, or edit shapes 210 (representing steps), connections 220 (representing relationships between the steps), or associated content of the client workflow 134. The user may also interact with the client interface 132 to input text descriptors 230 (e.g., a title and/or a brief description) for a shape/step 210 of the client workflow 134. Modifying the client workflow 134 in the client interface 132 automatically causes the corresponding database workflow 118 to be modified and stored in the database 116 in real-time.

In some embodiments, the user may interact with the client interface 132 to associate content with one or more shapes/steps 210 of the client workflow 134. In these embodiments, the associated content may comprise a wide range of content, such as digital online content 142 from a content server 140 that is accessed via a network 120 (e.g., Internet). For example, the associated content may comprise multimedia content (audio or video), images, websites, Uniform Resource Locators (URLs), tutorials, articles, blogs, discussion forums, documents, presentation slides, downloadable files, etc. The associated content may originate from a variety of online sources, such as various content servers 140A-N. A content server 140 may correspond to a physical computing system (e.g., a system in a data center) or may be a virtual computing instance executing within a computing cloud. The content server 140 may present the content 142 within websites or webpages. Thus, the authoring platform 100 allows an author to associate content from virtually any digital online web resource (or other source of information).

Figure 3:
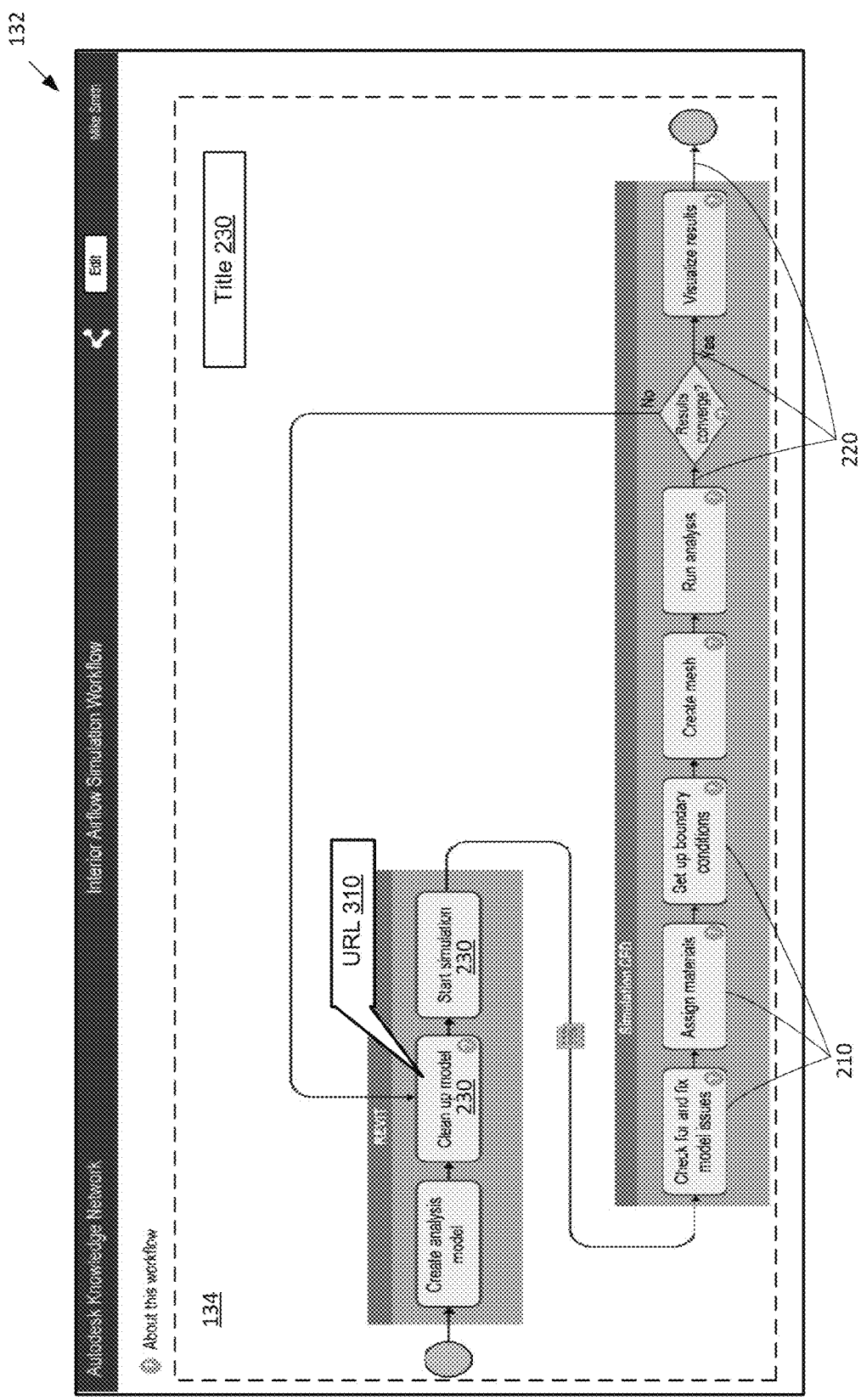
FIG. 3 illustrates a screenshot of a client interface for associating online content with a client workflow, according to various embodiments.

FIG. 3 illustrates a screenshot of a client interface 132 for associating online content with a client workflow 134, according to various embodiments. The client interface 132 may comprise a workflow editor and a web-browser application capable of accessing online content 142 from content servers 140 via a network 120 (e.g., Internet). Via the client interface 132, the author/user may first select a specific shape/step 210 of the client workflow 134 to associate content with the shape/step 210. For example, the user may select (e.g., by clicking on or hovering over a cursor over) a particular shape/step 210 causing the client interface 132 to display a URL field 310 in response. The user may then input a URL that specifies the location of a web resource that comprises the associated content.

Upon receiving the URL of a web resource, the client interface 132 may execute or implement a web crawler or web data extractor service to crawl the web resource located at the received URL to extract metadata from the web resource. Examples of web crawler services that may be implemented by the client interface 132 include Bingbot by Microsoft®, FAST Crawler by Fast Search & Transfer®, Googlebot by Google® and the like. For example, the extracted metadata may include an author name, title, text content (text descriptions), image content, multimedia content (audio and video), etc. The extracted metadata may be referred to herein as content metadata. The client interface 132 then generates and sends a client payload representing the user interaction with the client workflow 134 to the authoring service 112. In these embodiments, the client payload may include the extracted content metadata that is sent to the authoring service 112. The authoring service 112 then causes and directs the corresponding database workflow 118 stored in the database 116 to associate the content with the specific node/step of the database workflow 118. For example, the authoring service 112 may associate online content 142 (e.g., video) with a specific node/step of the database workflow 118 in response to the user submitting the URL of a content server 140 (e.g., video sharing website).

Figure 4:
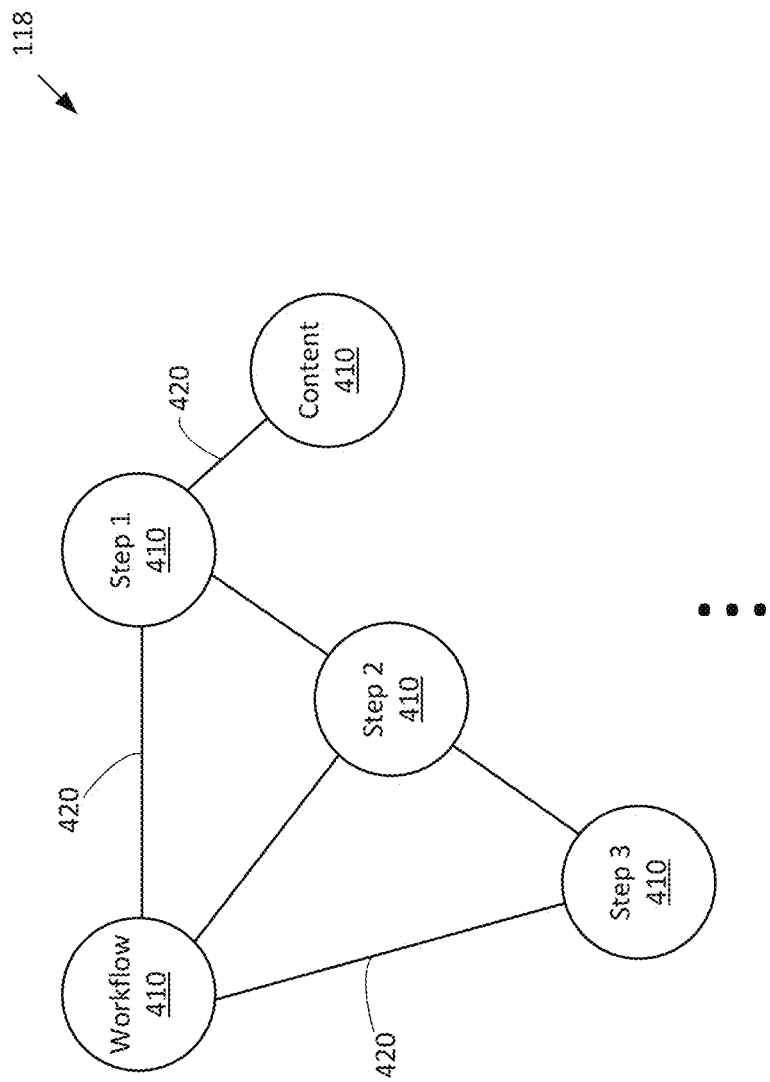
FIG. 4 illustrates a conceptual diagram of a graph database workflow stored in the graph database of FIG. 1, according to various embodiments.

FIG. 4 illustrates a conceptual diagram of a graph database workflow 118 stored in the graph database 116 of FIG. 1, according to various embodiments. The database workflow 118 may be created for a corresponding client workflow 134 that is created by a user in the client interface 132. The database engine 117 may store each client workflow 134 as a separate database workflow 118 in the database 116.

As shown, the database workflow 118 represents a workflow (such as client workflow 134) as a graph structure comprising workflow item nodes 410 and edges 420. A workflow item node 410 of the database workflow 118 may represent the overall workflow, a particular shape/step of the workflow, or associated content. A database workflow 118 may include different types of nodes, each different type of node representing a different type of workflow item. As used herein, a workflow node represents the overall workflow, a step node represents a shape/step, and a content node represents associated content. In some embodiments, the database workflow 118 includes at least one content node that represents online content associated with a particular shape/step of the workflow. For a content node, the associated content may also be stored to the database 116 and linked to the content node. Also, each node 410 of the database workflow 118 comprises a unique identifier (assigned by the authoring service 112). In general, a node representing a workflow item may be referred to as a workflow item node (which comprises a workflow node, step node, or content node).

An edge 420 comprises a connection between two node 410s and represents a relationship between the two node 410s. A database workflow 118 may include different types of edges 420 representing different types of relationships between two node 410s, such as a contain/workflow edge, precede/step edge, or associated/content edge. A contain edge 420 connects a first node 410 representing the workflow and a second node 410 representing a step contained within the workflow, the contain edge 420 representing this relationship between the workflow and the contained step. A contain edge may also be referred to herein since a workflow edge since it connects to a workflow node. A precede edge 420 connects two node 410s that represent two steps of the workflow whereby a first step precedes a second step, the precede edge 420 representing the sequence/ordering relationship between the two steps of the workflow. Thus, the edges 420 may indicate the sequence/ordering of steps of the workflow (such as a first step that precedes a second step and a third step that follows the second step). A precede edge may also be referred to herein as a step edge since it connects wo step nodes. An associated edge 420 connects a first node 410 representing a first step of the workflow and second node 410 representing content associated with the first step of the workflow, the associated edge 420 representing this associated relationship between the first step and the content. An associated edge may also be referred to herein as a content edge since it connects to a content node. As shown in FIG. 4, an edge 420 may include a description of the relationship, such as "contains" for a contain/workflow edge, "precedes" for a precede/step edge, or "associated" for an associated/content edge.

Figure 5:
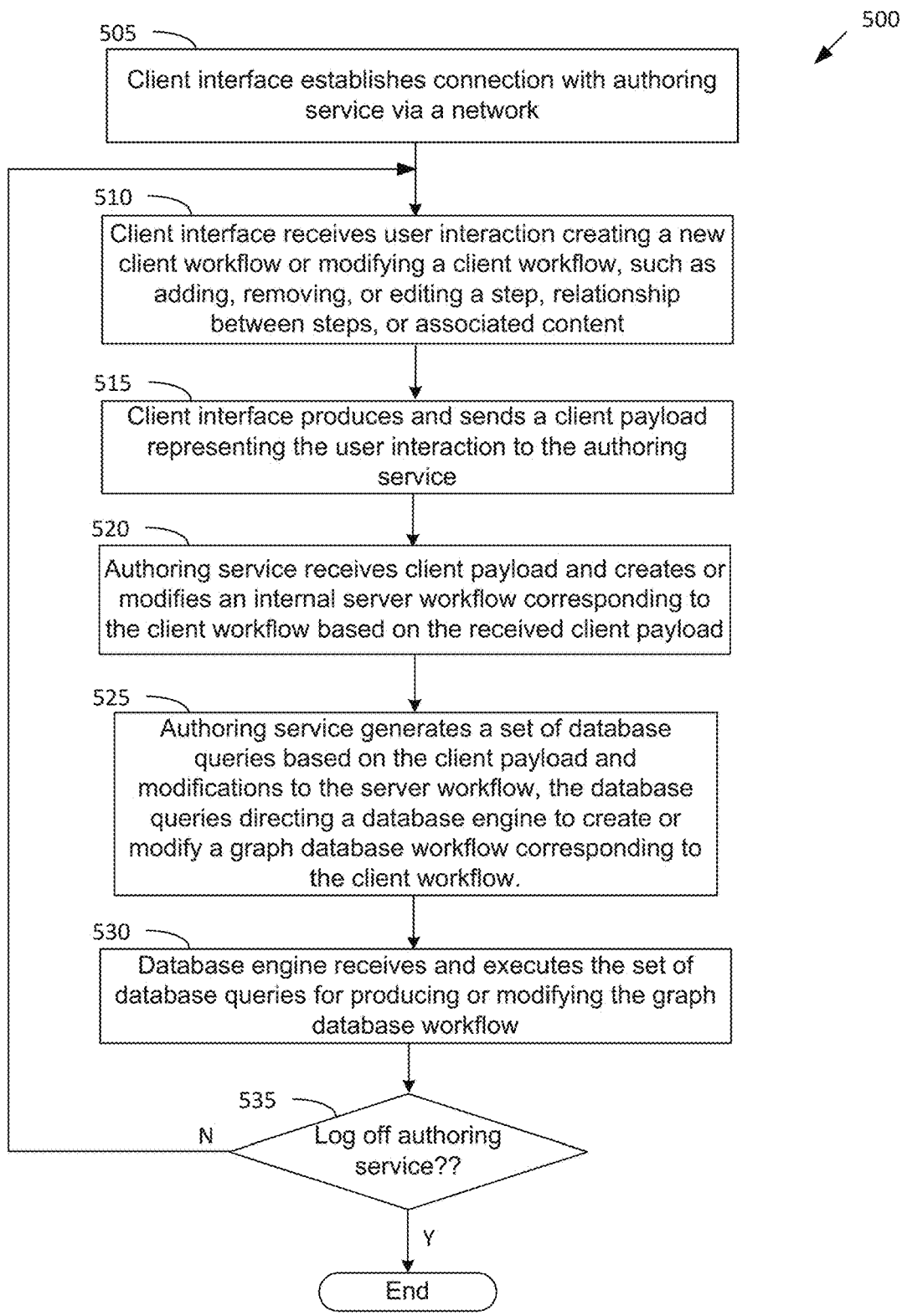
FIG. 5 illustrates a flow diagram of method steps for authoring a workflow, according to various embodiments.

FIG. 5 illustrates a flow diagram of method steps for authoring a workflow, according to various embodiments. Although the method steps are described in conjunction with the systems of FIGS. 1-4, persons skilled in the art will understand that any system configured to perform the method steps, in any order, is within the scope of the invention. In some embodiments, the method 500 may be performed by the client interface 132 executing on a client computer 130, an authoring service engine 112 executing on a server computer 110, and a database engine 117 executing on a database 116.

The method 500 begins when the client interface 132 establishes an authenticated connection with the authoring service 112 via a network 120 (at step 505). For example, the client interface 132 may receive a username and password from an author/user and submit the username and password to the authoring service 112. The authoring service 112 validates the username and password to ensure that the author/user has permission to access the authoring service 112.

The client interface 132 then receives (at step 510) a user interaction creating a new client workflow 134 or modifying a client workflow 134. For example, the received user interaction may comprise the author/user creating a new client workflow 134 and inputting text descriptors (e.g., author name, title, and/or brief description) for the new client workflow 134. For example, the user may add, remove, or edit the steps, relationships between the steps, or associated content of the client workflow 134. As shown in FIG. 2, the received user interaction may comprise an adding, removing, or editing of one or more geometric shapes 210 representing steps and/or one or more connections 220 representing relationships between the steps. As shown in FIG. 3, the received user interaction may comprise an adding, removing, or editing of content associated with a specific shape/step of the client workflow 134. In the case where the associated content comprises an online resource specified by a URL, the client interface 132 implements a web crawler service to extract content metadata from the online resource.

The client interface 132 then produces and sends (at step 515) a client payload to the authoring service 112, the client payload representing the received user interaction. The client payload may comprise client requests and client metadata representing the received user interaction with the client workflow 134. Thus, the client interface 132 may receive a user interaction and translate the user interaction to client requests and client metadata. For example, the client requests may comprise HTTP Representational State Transfer (RESTful) web-server requests (a software architectural style common on the World Wide Web). The client metadata may comprise different types of metadata including general metadata, context metadata, and content metadata. Each received user interaction affects one or more workflow items in the client workflow 134, such as the overall client workflow 134 or a step, connection, or associated content within the client workflow 134. General metadata may identify each affected workflow item and specify text descriptors for each affected workflow item (such as author name, title, and/or brief text description). Context metadata may specify the context of each affected workflow item within the client workflow 134, such as relationships between the affected workflow items and unaffected workflow items within the client workflow 134. For example, context metadata may specify that a first step precedes a second step within the client workflow 134 or that a content is associated with a second step of the client workflow 134. Content metadata may comprise metadata extracted from an online resource comprising an associated content. In some embodiments, the client payload is formatted in the JSON format.

The authoring service 112 receives (at step 520) the client payload from the client interface 132 and creates or modifies an internal server workflow 115 corresponding to the client workflow 134 based on the received client payload. In particular, the authoring service 112 may compare the client requests and client metadata (contained in the received client payload) to the server workflow 115 to determine a modification/difference between the client requests and client metadata and the server workflow 115. The authoring service 112 may then modify the server workflow 115 based on the determined modification/ difference. Thus, the modifications to the server workflow 115 reflect the modifications to the client workflow 134 made by the user interaction.

Based on the received client payload and the modifications to the server workflow 115, the authoring service 112 also generates (at step 525) a set of database query statements that directs the database engine 117 to create or modify a graph database workflow 118 corresponding to the client workflow 134 and the server workflow 115. In particular, the authoring service 112 may translate the modifications made to the server workflow 115 (in step 520) to a set of database query statements that produce corresponding/equivalent modifications to the graph database workflow 118. The set of database query statements may also specify a unique identifier for each affected node of the database workflow 118. The authoring service 112 also sends (at step 525) the set of database query statements to the database engine 117.

The database engine 117 receives and executes (at step 530) the set of database query statements on a graph database workflow 118 corresponding to the client workflow 134 and the server workflow 115. The set of database query statements are understandable and executable by the database engine 117 for creating a new database workflow 118 representing a new client workflow 134 or modifying a database workflow 118 representing a client workflow 134, the new database workflow 118 or modifications to a database workflow 118 being automatically and persistently stored to the database 116. The modifications to the database workflow 118 reflect the modifications to the server workflow 115 and the client workflow 134 made by the user interaction.

The client interface 132 then determines (at step 535) whether a user input is received for quitting the session or logging off the authoring service 112. If so, the method 500 ends. If not, the method 500 continues at step 510 where the client interface 132 receives a new user interaction with the client workflow 134.

Overall, multiple iterations of the method 500 are performed to process multiple user interactions that create and modify the client workflow 134 to produce the completed client workflow 134. Thus, through multiple iterations of the method 500, the client interface 132 produces a completed client workflow comprising an arrangement of shapes and connections, each shape representing a step of the client workflow and each connection representing a relationship between two steps of the client workflow. The completed client workflow 134 is received at a authoring service 112 which produces a set of database queries for producing a database workflow 118 corresponding to the completed client workflow 134. The database workflow 118 comprises an arrangement of step nodes and step edges, each step node representing a step of the client workflow and each step edge representing a relationship between two steps of the client workflow. The set of database queries are sent to the graph database 116 to produce and store the database workflow 118 corresponding to the completed client workflow 134.

Associated content for a particular step of the client workflow 134 may also be received from the client interface 132 at the authorizing service 112. In response, the authorizing service 112 produces a set of database queries for producing a content node and content edge in the database workflow 118, the content node representing the associated content and the content edge representing an associated relationship between the content node and a step node representing the particular step of the client workflow 134. The set of database queries are sent to the graph database 116 to add the content node and content edge to the database workflow 118 and store and link the associated content with the database workflow 118 in the database 116.

Presenting Workflows from a Graph Database

A client workflow 132 that is created by the authoring platform 100 and stored to the database 116 as a corresponding database workflow 118 may be later retrieved from the database 116 and displayed at a client interface 132. A database workflow 118 stored to the database 116 may be accessed by any client computer 130 executing a client interface 132 via the network 120 (assuming the user has access permissions). Thus, the authoring platform 100 enables web-based access to database workflows 118 that allows broad collaboration and distribution of the database workflows 118 to any users (having access permission) across the web.

Figure 6:
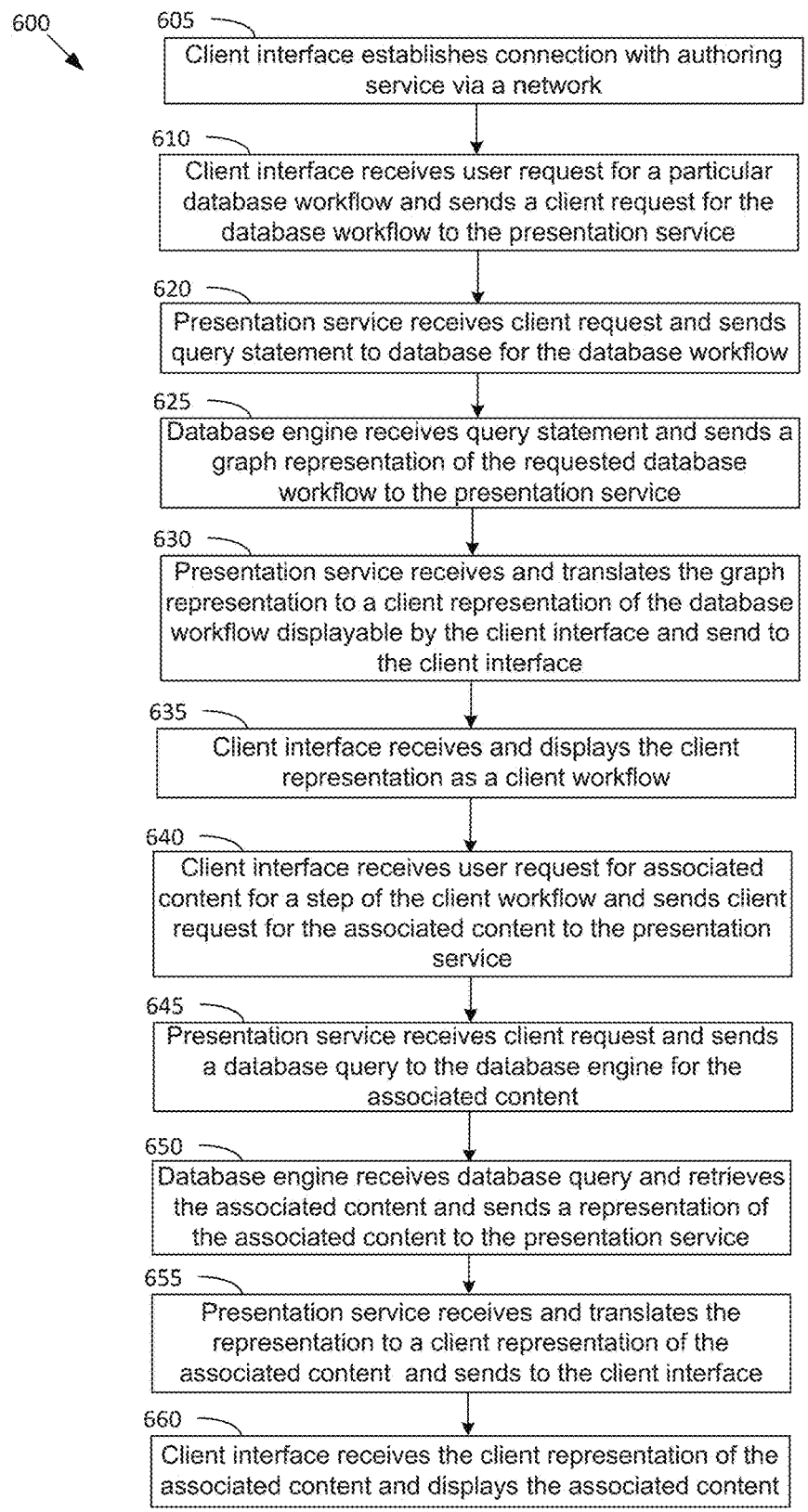
FIG. 6 illustrates a flow diagram of method steps for retrieving and presenting a workflow, according to various embodiments.

FIG. 6 illustrates a flow diagram of method steps for retrieving and presenting a workflow, according to various embodiments. Although the method steps are described in conjunction with the systems of FIGS. 1-4, persons skilled in the art will understand that any system configured to perform the method steps, in any order, is within the scope of the invention. In some embodiments, the method 600 may be performed by the client interface 132 executing on a client computer 130, an presentation service engine 114 executing on a server computer 110, and a database engine 117 executing on a database 116.

The method 600 begins when the client interface 132 establishes an authenticated connection with the presentation service 114 via a network 120 (at step 605). For example, the client interface 132 may a receive a username and password from an author/user and submit the username and password to the presentation service 114. The presentation service 114 validates the username and password to ensure that the author/user has permission to access the presentation service 114.

The client interface 132 then receives (at step 610) a user input requesting a particular database workflow 118 (corresponding to a previously created client workflow 134). For example, the user may input the author name and title of the desired database workflow 118. The client interface 132 also sends (at step 610) a client request for the desired database workflow 118 to the presentation service 114. In particular, the client interface 132 sends a request for a representation of desired database workflow 118 that is understandable and executable/displayable by the client interface 132 as a client workflow 134.

The presentation service 114 receives (at step 620) the client request for the database workflow 118 and sends a database query statement to the database engine 117 for the database workflow 118. The database engine 117 receives (at step 625) the database query statement for the database workflow 118 and sends a graph representation of the requested database workflow 118 to the presentation service 114. For example, the graph representation may comprise a JSON representation comprising a list of nodes and edges comprising the requested database workflow 118. In some embodiments, the graph representation does not include any associated content.

The presentation service 114 then receives and translates (at step 630) the graph representation of the database workflow 118 to a client representation of the database workflow 118 that is understandable and executable/displayable by the client interface 132. For example, the presentation service 114 may "flatten" the graph representation by removing information (data and fields) in the graph representation that is not understandable and executable by the client interface 132. In some embodiments, the flattened graph representation comprises a flattened JSON representation comprising a simplified and translated version of the original JSON representation. The presentation service 114 also sends (at step 630) the client representation of the database workflow 118 to the client interface 132.

The client interface 132 receives (at step 635) the client representation and displays the client representation of the database workflow 118 as a client workflow 134. For example, FIG. 2 illustrates a screenshot of a client interface 132 for presenting/displaying a requested client workflow 134, according to various embodiments. As shown, the client workflow 134 comprise a graphical diagram that represents a workflow process as an arrangement of connected geometric shapes 210, each geometric shape 210 representing a step of the workflow.

The client interface 132 then receives (at step 640) a user input requesting associated content for a particular step of the client workflow 134. For example, the user may select (e.g., by clicking on or hovering a cursor over) a particular shape displayed in the client interface 132 that represents a step of the client workflow 134. The client interface 132 also sends (at step 640) a client request for the associated content to the presentation service 114. In particular, the client interface 132 sends a request for a representation of associated content that is understandable and executable/displayable by the client interface 132.

The presentation service 114 receives (at step 645) the client request for the associated content and sends a database query statement to the database engine 117 for the associated content. The database engine 117 receives (at step 650) the database query statement for the associated content, retrieves the associated content from the database 116, and sends a JSON representation of the associated content to the presentation service 114.

The presentation service 114 then receives and translates (at step 655) the JSON representation of the associated content to a client representation of the associated content that is understandable by the client interface 132. For example, the presentation service 114 may "flatten" the JSON representation by removing information (data and fields) in the JSON representation that is not understandable and executable by the client interface 132. Thus, the flattened JSON representation comprises a simplified and translated version of the original JSON representation. The presentation service 114 also sends (at step 655) the JSON representation of the associated content to the client interface 132.

Figure 7:
FIG. 7 illustrates a screenshot of a client interface for displaying content associated with a client workflow, according to various embodiments.

The client interface 132 receives (at step 660) the client representation (flattened JSON representation) of the associated content and displays the associated content. FIG. 7 illustrates a screenshot of a client interface 132 for displaying content associated with a client workflow 134, according to various embodiments. In the example of FIG. 7, the user has requested content associated with a specific shape/step 710 of the client workflow 134 (e.g., by clicking on the shape/step 710). In response, the content associated with the selected shape/step 710 is retrieved from the database 116 and displayed in the client interface 132. In the example of FIG. 7, the associated content 720 comprises a webpage (including a video) that is obtained from an online resource. The method 600 then ends.

Section II: Platform for Searching Workflows

While workflows are effective tools for providing visual understandings of various processes to beginners and experienced users alike, conventional workflows are not organized or related in a way that allows easy search and retrieval of workflows relevant to a particular topic. Thus, conventional organization and storage techniques for authored workflows do not allow easy searching and sharing among other users, which creates substantial inefficiencies through "recreating the wheel," for example.

Embodiments described herein provide an authoring and search platform for creating and searching workflows using at least one predefined taxonomy of tags. A taxonomy comprises a hierarchy of topics/tags and sub-topics/sub-tags. Each predefined taxonomy of tags may be stored to a graph database as a database taxonomy. A database taxonomy comprises an arrangement of tag nodes and edges, the tag nodes representing tags of the taxonomy and the edges representing relationships between the tag nodes (such as parent-child relationships). The database taxonomy may be sent to a server computer which produces a simplified internal abstract representation/model of the database taxonomy (referred to as a server taxonomy). The server computer may send a further simplified version of the server taxonomy (referred to as a client taxonomy) to a client computer.

An author/user may interact with a client interface residing on the client computer to create or modify client workflows comprising workflow items (such as the overall workflow, a shape/step of the workflow, and associated content). In some embodiments, when creating a client workflow, at least a first tag is received (via the client interface) from the author for at least a first workflow item. For example, a first tag may be received and linked to the overall workflow, a specific shape/step of the workflow, and/or a specific associated content. The first tag may be selected by the author from the client taxonomy (comprising a predefined taxonomy of tags) which is displayed to the author. In other embodiments, the first tag may comprise a new tag that is not included in the client taxonomy.

The client interface may send client payloads to the server computer representing the client workflow and the first tag linked to the first workflow item. In response, the server computer may produce query statements that cause and direct the graph database to store the client workflow as a database workflow comprising an arrangement of workflow item nodes (representing workflow items) and edges (representing relationships between the nodes). The server computer may also produce query statements that cause and direct the graph database to link a first node in the database workflow representing the first workflow item to a first tag node in the database taxonomy representing the first tag. This process may be repeated to receive additional tags linked to additional workflow items in the client workflow, which causes additional nodes in the database workflow to be linked to additional nodes in the database taxonomy within the graph database. Doing so produces links/relationships between workflow items of a single workflow to tags within the taxonomy, these links/relationships being captured in the graph database.

A plurality of workflows may be created in a similar manner from a plurality of different authors. Since each workflow is linked to the database taxonomy in the graph database, the plurality of workflows are also linked and related together in a meaningful way via the database taxonomy. For example, a first workflow may include a first workflow item linked to a first tag in the database taxonomy and a second workflow may include a second workflow item also linked to the first tag in the database taxonomy. Therefore, the first workflow and the first workflow item are linked, via the first tag in the database taxonomy, with the second workflow and the second workflow item. Such links/relationships may be built between large numbers of workflows via the database taxonomy, which can provide powerful and efficient search capabilities via the database taxonomy.

In some embodiments, previously created workflows may be searched by implementing the database taxonomy stored to the graph database. A user may input a search tag via a client interface, which causes a search of the received tag within the database taxonomy on the graph database. When a matching node representing the received tag is found in the database taxonomy, any workflows linked to the matching node are traversed and returned in the search results. Without the links/relationships being built between the numerous workflows and the database taxonomy, a search for the received tag would require traversal of all workflows stored to the database. In contrast, the embodiment herein provide a fast and efficient search of the received tag across a large number of workflows as the search is confined to only those workflows that are linked to the matching node of the database taxonomy. This enables a search solution that is scalable as the number of workflows stored to the database continually increases.

Authoring and Searching Environment

Figure 8:
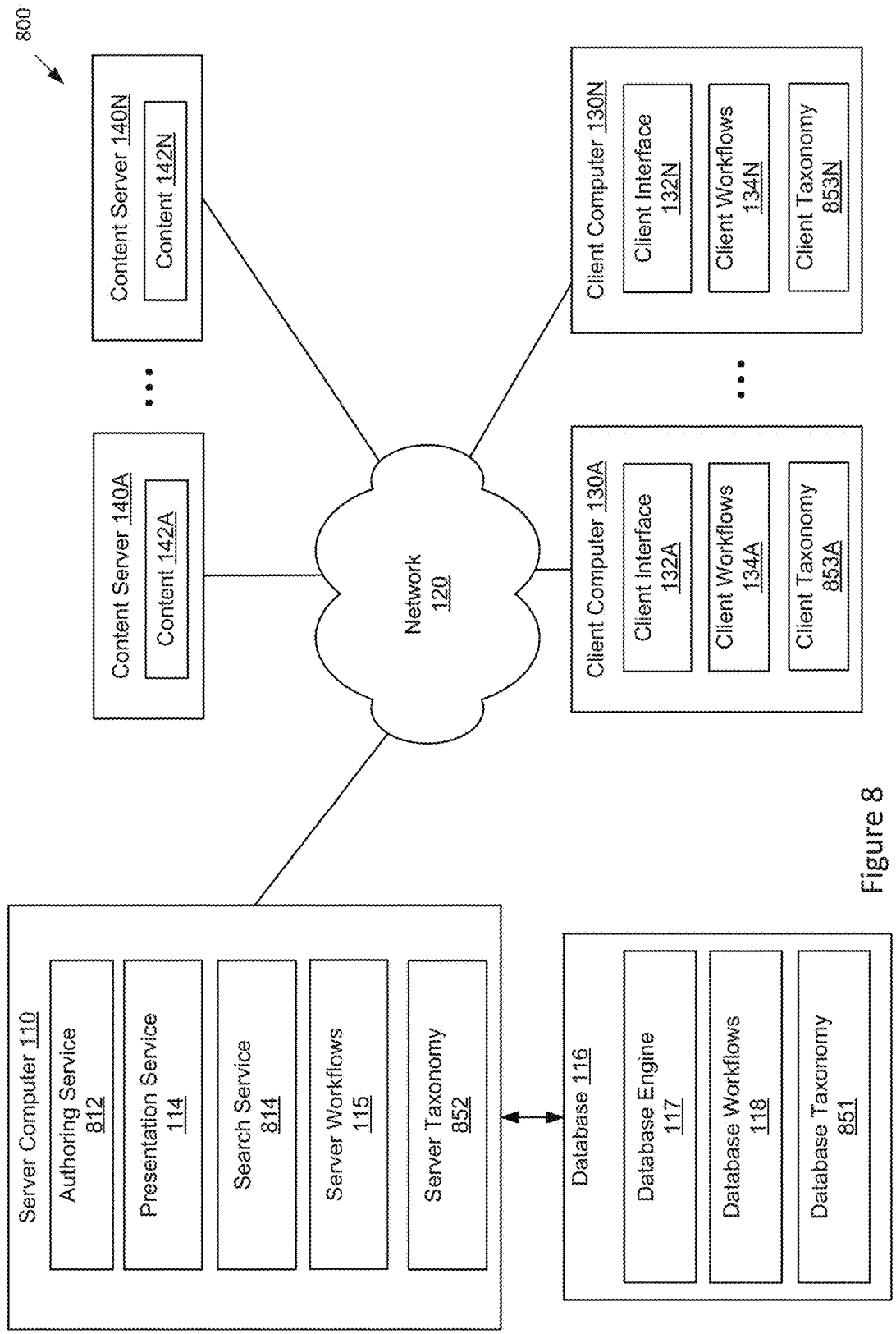
FIG. 8 illustrates an authoring and search platform environment, according to various embodiments.

FIG. 8 illustrates an authoring and search platform environment 800 configured to implement one or more aspects of the present invention. The authoring and search platform environment 800 enables authoring and searching of workflows to a graph database using a tag taxonomy. The authoring and search platform environment 800 comprises some components that correspond to components of the authoring platform environment 100 shown in FIG. 1 and are not discussed in detail here. The components and features of the authoring and search platform environment 800 that are different from the components and features described in relation to the authoring platform environment 100 of FIG. 1 are discussed below.

As shown, the environment 800 includes at least one client computer 130 (e.g., 130A-130N), a server computer 110, and at least one content server 140 (e.g., 140A-140N) coupled via a network 120. Each client computer 130 hosts and executes a client interface engine 132, the server computer 110 hosts and executes an authoring service engine 812 and a search service engine 814. The server computer 110 is also coupled to a graph database 116 comprising a database engine 117 that organizes and stores database workflows 118.

As shown in FIG. 8, the client computer 130, server computer 110, and the graph database 116 each stores (e.g., in memory or storage) a separate and distinct version/representation of a predefined taxonomy. A taxonomy comprises a hierarchical arrangement of topics/tags, where a tag may be a "child" of another tag to form a hierarchy of topics/tags and sub-topics/sub-tags. A taxonomy may be created for an overall topic, whereby each tag or sub-tag in the taxonomy may specify a particular topic or sub-topic of the overall topic. For example, a taxonomy may be created for all software products of a company (the overall topic), whereby sub-topics may include office software, multimedia software, web-based software, and security software. Each sub-topic may also include further sub-topics, such as names of particular software products within the sub-topic, and so forth. The resulting taxonomy of tags may include tags and sub-tags corresponding to each of the topics and sub-topics.

The graph database 116 stores a database taxonomy 851 comprising an arrangement of tag nodes and edges, the tag nodes representing topics/tags of the taxonomy and the edges representing relationships between the topics/tags (such as parent-child relationships). The database taxonomy 851 may comprise a persistent/permanent record of a tag taxonomy in the form of nodes, relationships, and property records (as well as database artifacts such as indexes and constraints). The database taxonomy may also exist in an expanded form in a memory of the server computer 110 when the database engine 117 is activated, whereby the form of the database taxonomy 851 is configured to provide an optimal performance database environment after the expansion.

Figure 9:
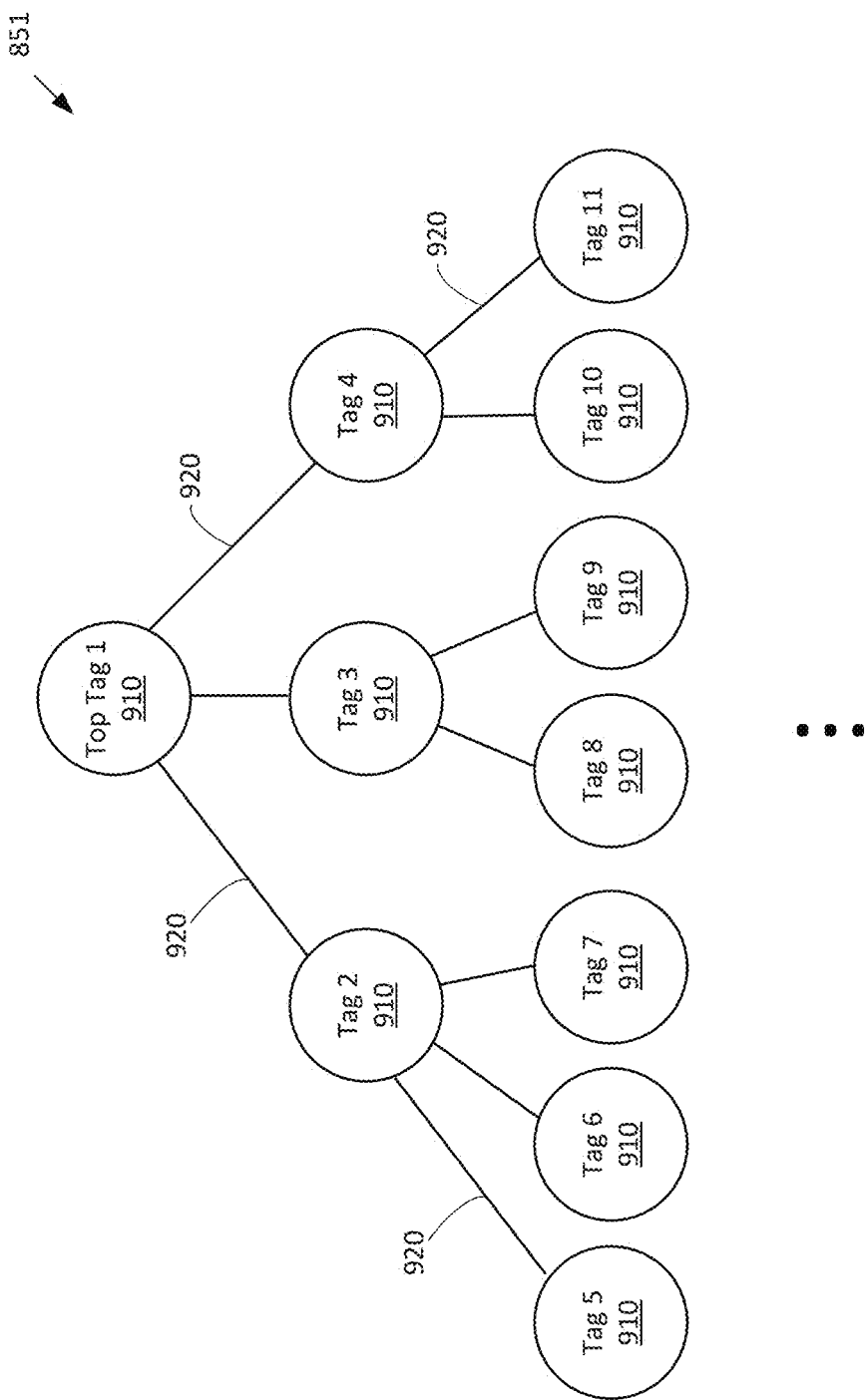
FIG. 9 illustrates a conceptual diagram of a database taxonomy stored in the graph database of FIG. 8, according to various embodiments.

FIG. 9 illustrates a conceptual diagram of a database taxonomy 851 stored in the graph database 116 of FIG. 8, according to various embodiments. The database taxonomy 851 represents a taxonomy of tags comprising a hierarchy of topics/tags and sub-topics/sub-tags. A taxonomy may be created for an overall topic, whereby each tag or sub-tag in the taxonomy may specify a particular topic or sub-topic of the overall topic. One or more predefined taxonomies may be stored to the graph database 116 as one or more database taxonomies 851. As shown, a database taxonomy 851 represents a taxonomy of tags as a hierarchical arrangement of tag nodes 910 and tag edges 920. The tag nodes 910 represent topics/tags of the taxonomy and the tag edges 910 represent relationships between the tag nodes 910 (such as parent-child relationships or topic/sub-topic relationships). A top tag node 910 of the database taxonomy 851 may represent the overall topic/tag (such as all software products of a company), and child tag nodes 910 may represent sub-topics/sub-tags of the overall topic/tag (such as office software, multimedia software, web-based software, etc.). Each child tag nodes 910 may comprise zero or more grand-child nodes 910 representing sub-topics of the child tag nodes 910 (such as names of particular software products within the sub-topic), and so forth.

The server computer 110 stores a server taxonomy 852 that is a simplified abstract internal representation/model of the database taxonomy 851. The server taxonomy 852 may comprise a series of temporary object records that create an abstract model of the database taxonomy 851 for internal use by the server computer 110. The server taxonomy 852 is created from facets of the database taxonomy 851 that are exposed by database queries. Thus, the server taxonomy 852 may comprise faceted representations of the database taxonomy 851 that are exposed via database queries to create the server taxonomy 852 (comprising a series of temporary abstract models of facets of the database taxonomy 851).

The server computer 110 may send a further simplified version of the server taxonomy 852 (referred to as a client taxonomy 853) to each client computer 130 which stores the client taxonomy 853. A client taxonomy 853 may comprise a simplified version of the server taxonomy 852 as well as the database taxonomy 851. For example, the client taxonomy 853 may comprise a flattened version of the server taxonomy 852 and the database taxonomy 851 with hierarchical information removed. Thus, the client taxonomy 853 may comprise a flattened list of taxonomy tags instead of a hierarchy of taxonomy tags. In some embodiments, a client taxonomy 853 exists in transit as a JavaScript object in a memory of the client computer 130 and is displayed to a user in the form of rendered HTML markup.

Each different version of the taxonomy may comprise a different data format and syntax that is appropriate for the computing device on which the taxonomy version is stored. For example, the client taxonomy 853 is understandable and displayable by the client interface 132 residing on the client computer 130, whereas the database taxonomy 851 is not understandable and displayable by the client interface 132. The authoring service 812 residing on the server computer 110 may produce a server taxonomy 852 to assist translations between the database taxonomy 851 on the database 116 and the client taxonomy 853 on the client computer 130.

An author/user may interact with a client interface 132 executing on the client computer 130 to create and/or modify a client workflow 134 (as described in Section I). The client interface 132 may comprise a combined web-browser and workflow editor application that interacts with the service engines of the server computer 110 (such as authoring service engine 812 and search service engine 814). The author/user may also interact with the client interface 132 to input a tag for a specific workflow item (such as the overall workflow, a shape/step of the workflow, and associated content), whereby the client interface 132 determines that the specified workflow item is linked to the received tag.

Figure 10:
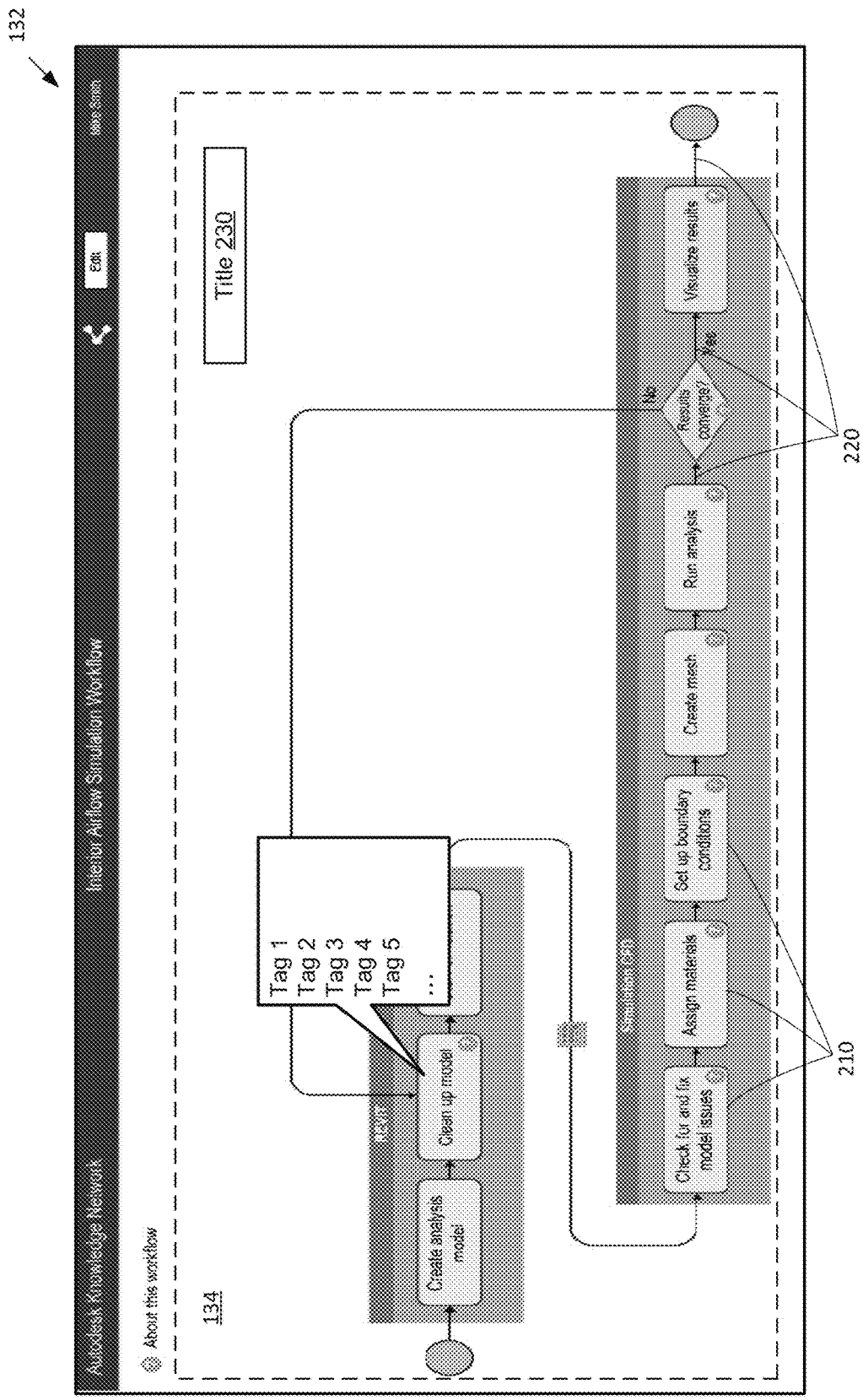
FIG. 10 illustrates a screenshot of a client interface for linking a tag with a workflow item, according to various embodiments.

FIG. 10 illustrates a screenshot of a client interface 132 for linking a tag with a workflow item, according to various embodiments. Via the client interface 132, the author/user may first select a specific workflow item of the client workflow 134 to link to a tag, such as the overall client workflow 134, a shape/step 210 of the workflow, or associated content. For example, the author/user may select a particular shape/step 210 of the client workflow 134 to link to a tag. In response, the client interface 132 may display the client taxonomy 853 near the selected shape/step 210, for example as a list of selectable tags 1010. The user may then select a tag from the displayed client taxonomy 853 (the list of selectable tags 1010), or enter a new tag not included in the client taxonomy 853.

The client interface 132 then sends client payloads representing the user interactions with the client workflow 134 to the authoring service 812 residing on the server computer 110. The client payload may comprise a set of client requests and client metadata representing the user interactions with the client workflow 134. As discussed in Section I, the client metadata may comprise different types of metadata including general metadata, context metadata, and content metadata. In some embodiments, the client metadata further includes tag metadata that specifies a workflow item and a received tag that is linked with the workflow item.

The authoring service 812 receives the client payloads representing the user interactions for a client workflow 134 to produce an internal server workflow 115 representation of the client workflow 134. As discussed in Section I, based on the received client payload and the internal server workflow 115, the authoring service 812 produces a set of database query statements that cause and direct the database engine 117 of the database 116 to store the client workflow 134 as a database workflow 118 comprising a set of workflow item nodes (representing workflow items) and edges (representing relationships between the nodes). Note that a workflow item node comprises a node of a particular database workflow 118, whereas a tag node comprises a node of the database taxonomy 851.

In some embodiments, in response to the tag metadata received in the client payload, the authoring service 812 performs several additional operations. For illustrative purposes, it is assumed that the received tag metadata specifies a first workflow item in a first client workflow 134 that corresponds to a first workflow item in a first server workflow 115 and a first workflow item node (representing a first workflow item) in a first database workflow 118. It is also assumed that the received tag metadata specifies a first tag in the client taxonomy 853 that is linked to the first workflow item in the first client workflow 134, the first tag in the client taxonomy 853 corresponding to a first tag in the server taxonomy 852 and a first tag node (representing the first tag) in the database taxonomy 853.

The authoring service 812 may first produce a link/relationship between the server taxonomy 852 and the first server workflow 115 according to the received tag metadata. In particular, the authoring service 812 may produce a link/relationship between the first tag in the server taxonomy 852 and the first workflow item in the first server workflow 115 according to the received tag metadata. In some cases, the received first tag comprises a new tag that is not included in the client taxonomy 853, and is also not included in the server taxonomy 852 or the database taxonomy 851. In these cases, the authoring service 812 may first dynamically create and insert a new tag in the server taxonomy 852 representing the received first tag. In some embodiments, all new tags are inserted in the server taxonomy 852 at a same flat level and are not interconnected with other tags of the server taxonomy 852. The authoring service 812 may then produce a link/relationship between the new tag in the server taxonomy 852 and the first workflow item in the first server workflow 115.

In addition, based on the link/relationship created between the between the server taxonomy 852 and the first server workflow 115, the authoring service 812 produces a set of linking query statements that cause and direct the graph engine 117 to produce a similar link/relationship between the database taxonomy 851 and the first database workflow 118 that reflects the received tag metadata In particular, the set of linking query statements may cause and direct the graph engine 117 to produce a link between the first tag node (representing the first tag) in the database taxonomy 851 to the first node (representing the first workflow item) in the first database workflow 118.

In the case where the received first tag comprises a new tag not included in the database taxonomy 851, the set of linking query statements cause and direct the graph engine 117 to dynamically create and insert a new tag node (representing the first tag) in the database taxonomy 851. Thus, the database taxonomy 851 may be considered a "living" taxonomy whereby new tags may be dynamically added to the taxonomy. In some embodiments, all new tag nodes representing new tags are inserted in the database taxonomy 851 at a same flat level and are not interconnected with other tags of the database taxonomy 851. The set of linking query statements may further cause and direct the graph engine 117 to produce a link between the new tag node (representing the first tag) in the database taxonomy 851 to the first node (representing the first workflow item) in the first database workflow 118.

The graph engine 117 receives and executes the set of database query statements (including the set of linking query statements) to create or modify the first database workflow 118 corresponding to the first client workflow 134 and produce a link between a first tag node or new tag node (representing the first tag) in the database taxonomy 851 to the first workflow item node (representing the first workflow item) in the first database workflow 118.

The above process may be repeated to receive additional tags linked to additional workflow items in the client workflow 134, which causes additional work item nodes in the database workflow 118 to be linked to additional tag nodes in the database taxonomy 851 within the graph database 116. Also, a plurality of client workflows 134 and database workflows 118 may be created in a similar manner from a plurality of different authors. Since each corresponding database workflow 118 is linked to the database taxonomy 851, a large number of database workflows 118 are also linked and related together in a meaningful way via the database taxonomy 851 to provide powerful and efficient search capabilities via the database taxonomy 851.

Figure 11:
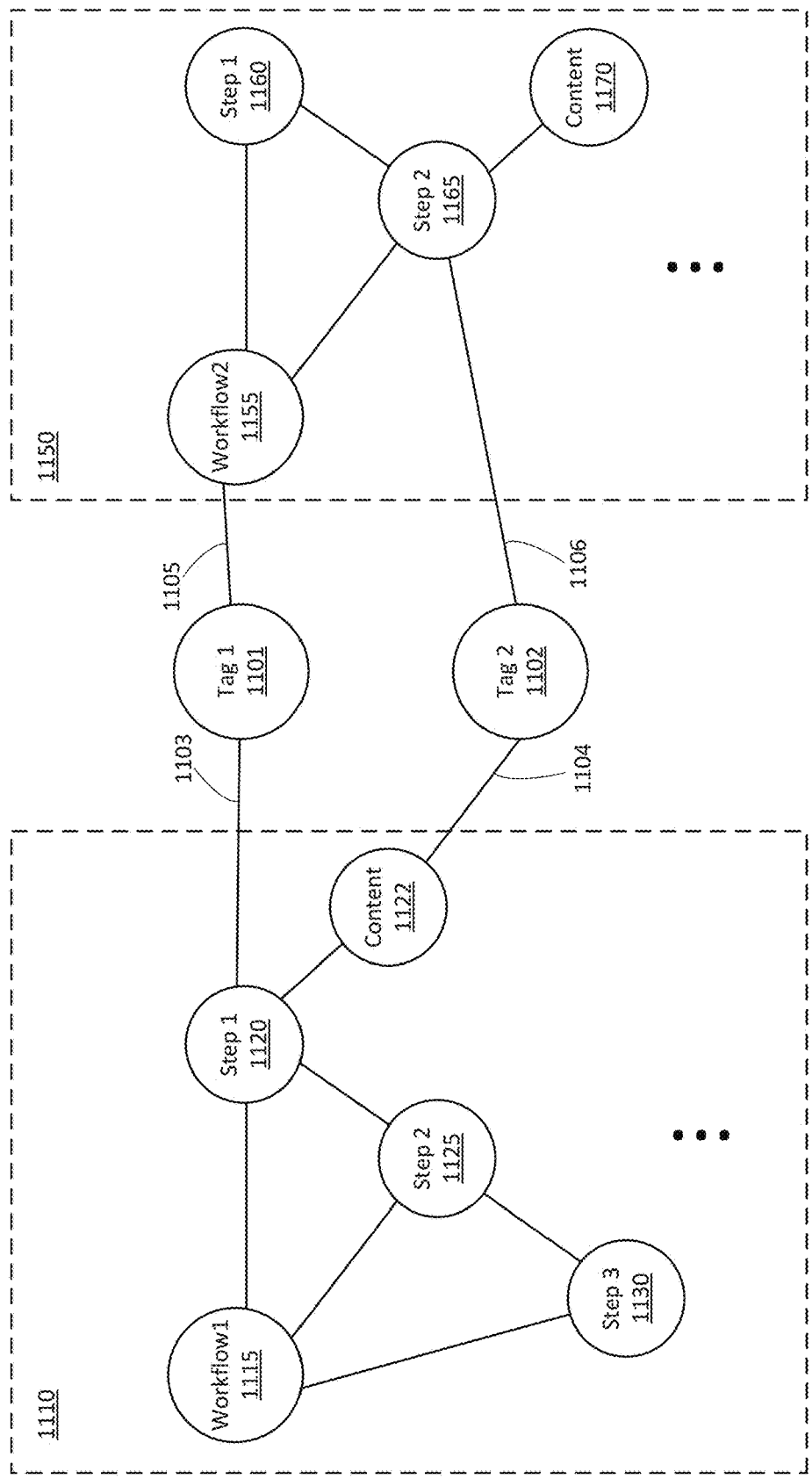
FIG. 11 illustrates a conceptual diagram of two database workflows linked to a database taxonomy, according to various embodiments.

FIG. 11 illustrates a conceptual diagram of two database workflows 118 linked to a database taxonomy 851, according to various embodiments. A first database workflow 1110 corresponds to a first client workflow 134 and a second database workflow 1150 corresponds to a second client workflow 134. A first tag node 1101 represents a first tag of the database taxonomy 851 and a second tag node 1102 represents a second tag of the database taxonomy 851. FIG. 11 also shows a plurality of linking edges 1103-1106. As used herein, a linking edge connects a tag node of the database taxonomy 851 to a workflow item node of a database workflow 118 and represents a linking relationship between the tag node and the workflow item node.

The first database workflow 1110 comprises a workflow node 1115 (representing the overall first client workflow), a first step node 1120 (representing a first step of the first client workflow), a second step node 1125 (representing a second step of the first client workflow), a third step node 1120 (representing a third step of the first client workflow), and so forth. Also, a content node 1122 is associated with the first step node 1120 (representing content associated with the first step of the first client workflow). The second database workflow 1150 comprises a workflow node 1155 (representing the overall second client workflow), a first step node 1160 (representing a first step of the second client workflow), a second step node 1165 (representing a second step of the second client workflow), and so forth. Also, a content node 1170 is associated with the second step node 1165 (representing content associated with the second step of the second client workflow).

In the example of FIG. 11, a first tag (represented by the first tag node 1101) is received from a user (via the client interface 132) for the first step of the first client workflow (represented by the first step node 1120), which causes the database engine 117 to create a first linking edge 1103 that links/connects the first tag node 1101 to the first step node 1120. A second tag (represented by the second tag node 1102) is also received for the content associated with the first step of the first client workflow (represented by the content node 1122 associated with the first step node 1120), which causes the database engine 117 to create a second linking edge 1104 that links/connects the second tag node 1102 to the content node 1122.

Further, a first tag (represented by the first tag node 1101) is received from a user (via the client interface 132) for the overall second client workflow (represented by the workflow node 1155), which causes the database engine 117 to create a third linking edge 1105 that links/connects the first tag node 1101 to the workflow node 1155. A second tag (represented by the second tag node 1102) is also received for the second step of the second client workflow (represented by the second step node 1165), which causes the database engine 117 to create a fourth linking edge 1106 that links/connects the second tag node 1102 to the second step node 1165.

Note that a work item node can also be linked to multiple tag nodes (not shown) if multiple tags are received for the work item. Also, the first tag node 1101 and the second tag node 1102 shown in FIG. 11 may represent predefined tags that were previously included in the database taxonomy 851 or new tags that were not previously included in the database taxonomy 851 (whereby the tag nodes 1101 and 1102 are dynamically created and inserted into the database taxonomy 851 by the database engine 117). Thus, the database taxonomy 851 may be considered a "living" taxonomy whereby new tags may be dynamically added to the taxonomy.

As shown, the linking edges 1103-1106 represent links/relationships built between the first database workflow 1110 and the second database workflow 1150 via the database taxonomy 851. In particular, the first database workflow 1110 and the second database workflow 1150 are linked via the first tag node 1101 and the second tag node 1102 of the database taxonomy 851. In general, such links/relationships between the database workflows 118 built through the database taxonomy 851 allows a large number of database workflows 118 to be quickly and efficiently searched.

Authoring and Storing Workflows Based on a Taxonomy

Figure 12:
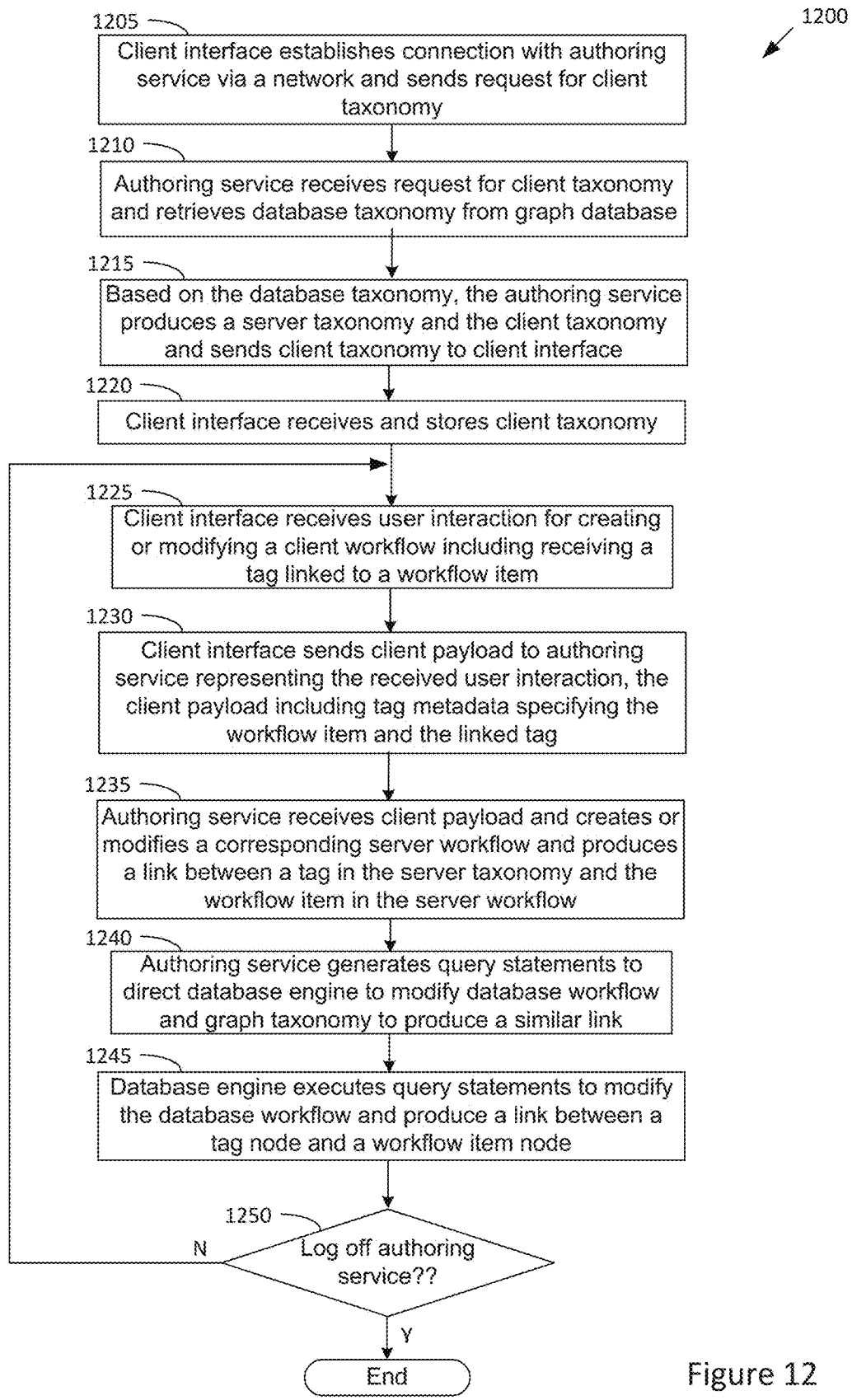
FIG. 12 illustrates a flow diagram of method steps for authoring and storing workflows based on a taxonomy, according to various embodiments.

FIG. 12 illustrates a flow diagram of method steps for authoring and storing workflows based on a taxonomy, according to various embodiments. Although the method steps are described in conjunction with the systems of FIGS. 1-4 and 7-11 persons skilled in the art will understand that any system configured to perform the method steps, in any order, is within the scope of the invention. In some embodiments, the method 1200 may be performed by the client interface 132 executing on a client computer 130, an authoring service engine 812 executing on a server computer 110, and a database engine 117 executing on a database 116. Some steps of the method 1200 are similar to steps of the method 500 of FIG. 5 and are not discussed in detail here. Prior to the method 1200, it is assumed that a database taxonomy 851 representing a predefined taxonomy of topics/tags is stored to graph database 116.

The method 1200 begins when the client interface 132 establishes an authenticated connection with the authoring service 812 via a network 120 (at step 1205) and sends a request to the authoring service 812 for a client representation (client taxonomy 853) of the database taxonomy 851 that is understandable and displayable by the client interface 132. In response, the authoring service 812 receives (at step 1210) the request for the client taxonomy 853 and retrieves the current database taxonomy 851 from the graph database 116. In some embodiments, the client interface 132 requests the client taxonomy 853 each time the client interface 132 connects to the authoring service 812 and the authoring service 812 retrieves the most recent and up-to-date client representation of the database taxonomy 851 (including the most recently added new tags) is received by the client interface 132.

Based on the database taxonomy 851, the authoring service 812 produces (at step 1215) a server taxonomy 852 and the requested client taxonomy 853. The server taxonomy 852 may comprise an abstract internal representation of the database taxonomy 851. The authoring service 812 may then produce the client taxonomy 853 based on the server taxonomy 852. The client taxonomy 853 may comprise a simplified version of the server taxonomy 852 as well as the database taxonomy 851. For example, the client taxonomy 853 may comprise a flattened version of the server taxonomy 852 and the database taxonomy 851 with hierarchical information removed. Thus, the client taxonomy 853 may comprise a flattened list of taxonomy tags instead of a hierarchy of taxonomy tags. The authoring service 812 also sends (at step 1215) the client taxonomy 853 to the client interface 132. The client interface 132 receives and locally stores (at step 1220) the client taxonomy 853.

The client interface 132 then receives (at step 1225) a user interaction creating a new client workflow 134 or modifying a client workflow 134. As shown in FIG. 2, the received user interaction may comprise an adding, removing, or editing of one or more geometric shapes 210 representing steps and/or one or more connections 220 representing relationships between the steps. As shown in FIG. 10, the received user interaction may comprise receiving a tag linked to a specific workflow item (such as the overall workflow, a shape/step of the workflow, and associated content). The received tag may comprise a predefined tag previously included in the client taxonomy 853 or new tag not previously included in the client taxonomy 853.

The client interface 132 then produces and sends (at step 1230) a client payload to the authoring service 812, the client payload representing the received user interaction. The client payload may comprise client requests and client metadata representing the received user interaction with the client workflow 134. The client metadata may comprise different types of metadata including general metadata, context metadata, content metadata, and tag metadata. The tag metadata may specify a workflow item (such as the overall workflow, a step, or associated content) and a received tag that is linked with the workflow item. In some embodiments, the client payload is formatted in the JSON format.

The authoring service 812 receives (at step 1235) the client payload from the client interface 132 and creates or modifies an internal server workflow 115 corresponding to the client workflow 134 and modifies the server taxonomy 852 based on the received client payload. In response to the received tag metadata, the authoring service 812 also performs several additional operations. For example, it is assumed that the received tag metadata specifies a first workflow item in a client workflow 134 that corresponds to a first workflow item in a server workflow 115 and a first workflow item node (representing the first workflow item) in a database workflow 118. It is also assumed that the received tag metadata specifies a first tag in the client taxonomy 853 that is linked to the first workflow item in the client workflow 134, the first tag in the client taxonomy 853 corresponding to a first tag in the server taxonomy 852 and a first tag node (representing the first tag) in the database taxonomy 853. The authoring service 812 may first produce a link between the server taxonomy 852 and the server workflow 115 according to the received tag metadata. In particular, the authoring service 812 may produce a link between the first tag in the server taxonomy 852 and the first workflow item in the server workflow 115. If the first tag is a new tag, the authoring service 812 may dynamically create a new tag in the server taxonomy 852 representing the received first tag and then produce a link between the new tag in the server taxonomy 852 and the first workflow item in the server workflow 115.

Based on the received client payload and the modifications to the server workflow 115 and the server taxonomy 852, the authoring service 812 also generates (at step 1240) a set of database query statements that directs the database engine 117 to create or modify a database workflow 118 (corresponding to the client workflow 134 and the server workflow 115) and modify the graph taxonomy 851. For example, the authoring service 812 may translate the modifications made to the server workflow 115 to a set of database query statements that produce corresponding/ equivalent modifications to the graph database workflow 118. In addition, at step 1240, based on the received client payload and link/relationship created between the between the server taxonomy 852 and the server workflow 115, the authoring service 812 produces a set of linking query statements that cause and direct the graph engine 117 to produce a similar link/relationship between the database taxonomy 851 and the database workflow 118 to reflect the received tag metadata. For example, the set of linking query statements may cause and direct the graph engine 117 to produce a link between the first tag node (representing the first tag) in the database taxonomy 851 to the first workflow item node (representing the first workflow item) in the database workflow 118. In the case where the received first tag comprises a new tag not included in the database taxonomy 851, the set of linking query statements cause and direct the graph engine 117 to dynamically create and insert a new tag node (representing the first tag) in the database taxonomy 851 and to produce a link between the new tag node (representing the first tag) in the database taxonomy 851 to the first workflow item node (representing the first workflow item) in the database workflow 118. The authoring service 812 also sends (at step 1240) the set of database query statements to the database engine 117, the set of database query statements including the set of linking query statements.

The database engine 117 receives and executes (at step 1245) the set of database query statements to create or modify a database workflow 118 corresponding to the client workflow 134. In addition, the graph engine 117 receives and executes the set of linking query statements to produce a link between a first tag node (representing the first tag) in the database taxonomy 851 to the first workflow item node (representing the first workflow item) in the database workflow 118. In the case where the first tag comprises a new tag, the graph engine 117 executes the set of linking query statements to dynamically create and insert a new tag node (representing the first tag) in the database taxonomy 851 and to produce a link between the new tag node to the first workflow item node in the database workflow 118.

The client interface 132 then determines (at step 1250) whether a user input is received for quitting the session or logging off the authoring service 812. If so, the method 1200 ends. If not, the method 1200 continues at step 1225 where the client interface 132 receives a new user interaction with the client workflow 134.

Overall, multiple iterations of the method 1200 are performed to process multiple user interactions that create and modify the client workflow 134 and to receive additional tags linked to additional workflow items in the client workflow 134, which thereby causes additional work item nodes in the database workflow 118 to be linked to additional tag nodes in the database taxonomy 851 within the graph database 116. Also, a plurality of client workflows 134 and database workflows 118 may be created from a plurality of different authors using the method 1200 to produce links/relationships between a plurality of database workflows 118 via the database taxonomy 851.

Searching Workflows Based on a Taxonomy

In some embodiments, previously created database workflows 118 may be searched by implementing the database taxonomy 851 stored to the graph database 116.

Figure 13:
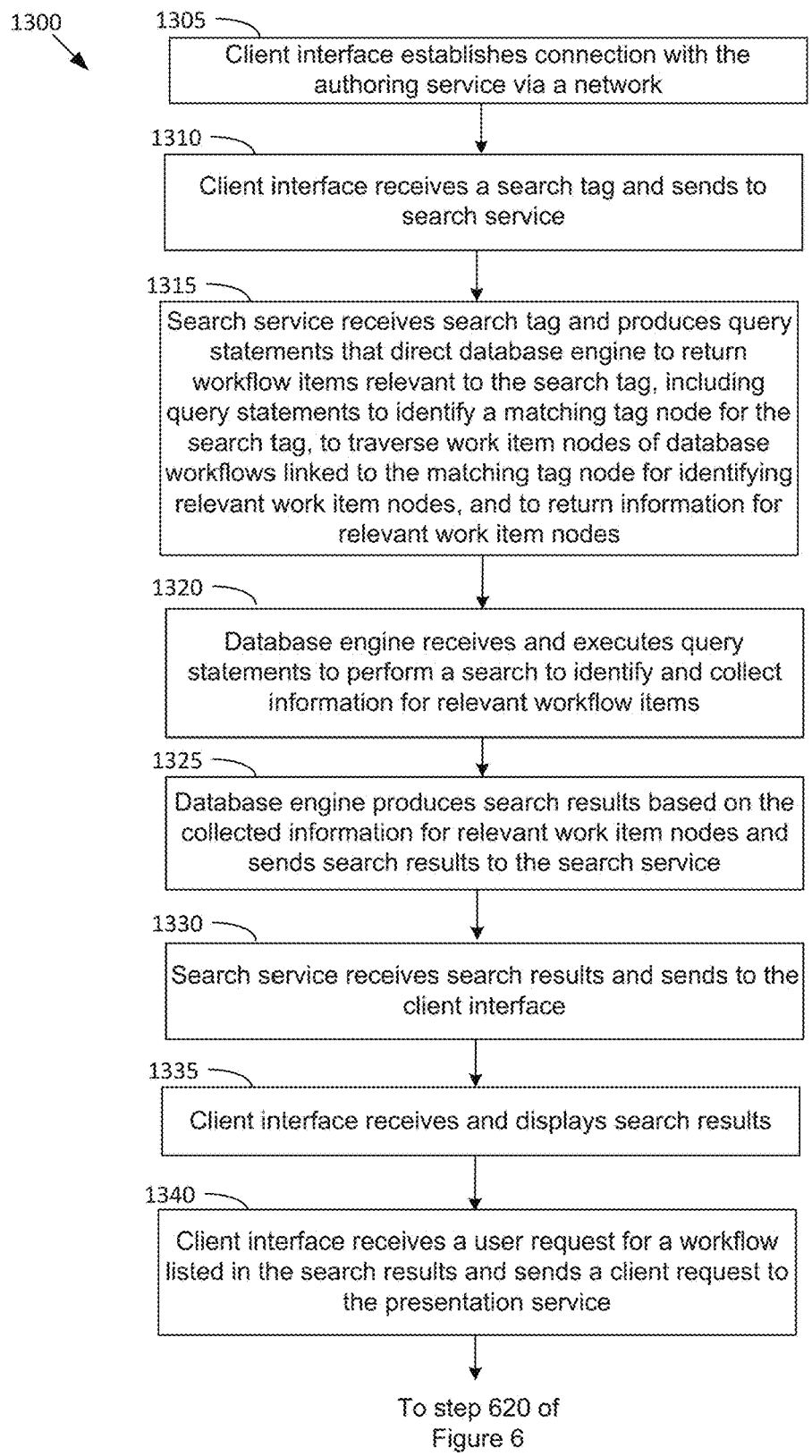
FIG. 13 illustrates a flow diagram of method steps for searching and presenting workflows based on a taxonomy, according to various embodiments.

FIG. 13 illustrates a flow diagram of method steps for searching and presenting workflows based on a taxonomy, according to various embodiments. Although the method steps are described in conjunction with the systems of FIGS. 1-4 and 7-11, persons skilled in the art will understand that any system configured to perform the method steps, in any order, is within the scope of the invention. In some embodiments, the method 1300 may be performed by the client interface 132 executing on a client computer 130, a search service engine 814 and a presentation service engine 114 executing on a server computer 110, and a database engine 117 executing on a database 116. Some steps of the method 1300 are similar to steps of the method 600 of FIG. 6 and are not discussed in detail here.

The method 1300 begins when the client interface 132 establishes an authenticated connection with the search service 814 via a network 120 (at step 1305). The client interface 132 then receives (at step 1310) a user input specifying a search tag and sends the search tag to the search service 814. A search tag may comprise one or more text terms. The client interface 132 may translate the search tag to an HTTP RESTful web-server request with a parameter (the search tag) which is then sent to the search service 814.

The search service 814 receives (at step 1315) the request specifying the search tag and produces a set of database query statements that cause and direct the database engine 117 to return workflow items (such as overall workflows, a step in a workflow, and/or associated content) relevant to the search tag. In particular, the database query statements may direct the database engine 117 to locate and identify a matching tag node in the database taxonomy 851, the matching tag node representing a tag matching the search tag and to begin the search at the matching tag node. The database query statements may also direct the database engine 117 to begin the traversing of work item nodes of database workflows 118 at each work item node linked to the matching tag node to identify work item nodes relevant to the search tag. Thus, by producing focused database query statements that confine the search and start the traversing operations at work item nodes linked to the matching tag node, an efficient search of relevant work item nodes across a large number of database workflows 118 may be performed.

The database query statements (produced at step 1315) may further direct the database engine 117 to traverse the work item nodes and return information for all relevant work item nodes (such as author, title, and/or brief description). For example, relevant work item nodes may be defined as work item nodes linked (by a linking edge) to the matching tag node. Also, for a step node (representing a step) that is linked to the matching tag node, a relevant node may also be defined to include the workflow node representing the overall workflow containing the step. For a content node (representing content associated with a step) that is linked to the matching tag node, a relevant node may also be defined to include a step node (representing a step associated with the content) and a workflow node representing the overall workflow containing the step and the associated content.

The database engine 117 receives and executes (at step 1320) the set of database query statements to perform a search process to identify and collect information for workflow items relevant to the search tag. In particular, the database engine 117 begins a search at the matching tag node in the database taxonomy 851 and begin a traversing process at each work item node linked to the matching tag node to identify and collect information on relevant work item nodes. When traversing the work item nodes, the database engine 117 moves from one connected work item node to another connected work item node to analyze and collect information on each work item node (such as author, title, and/or brief description). An example of the search process performed at step 1320 is shown in FIG. 14.

Figure 14:
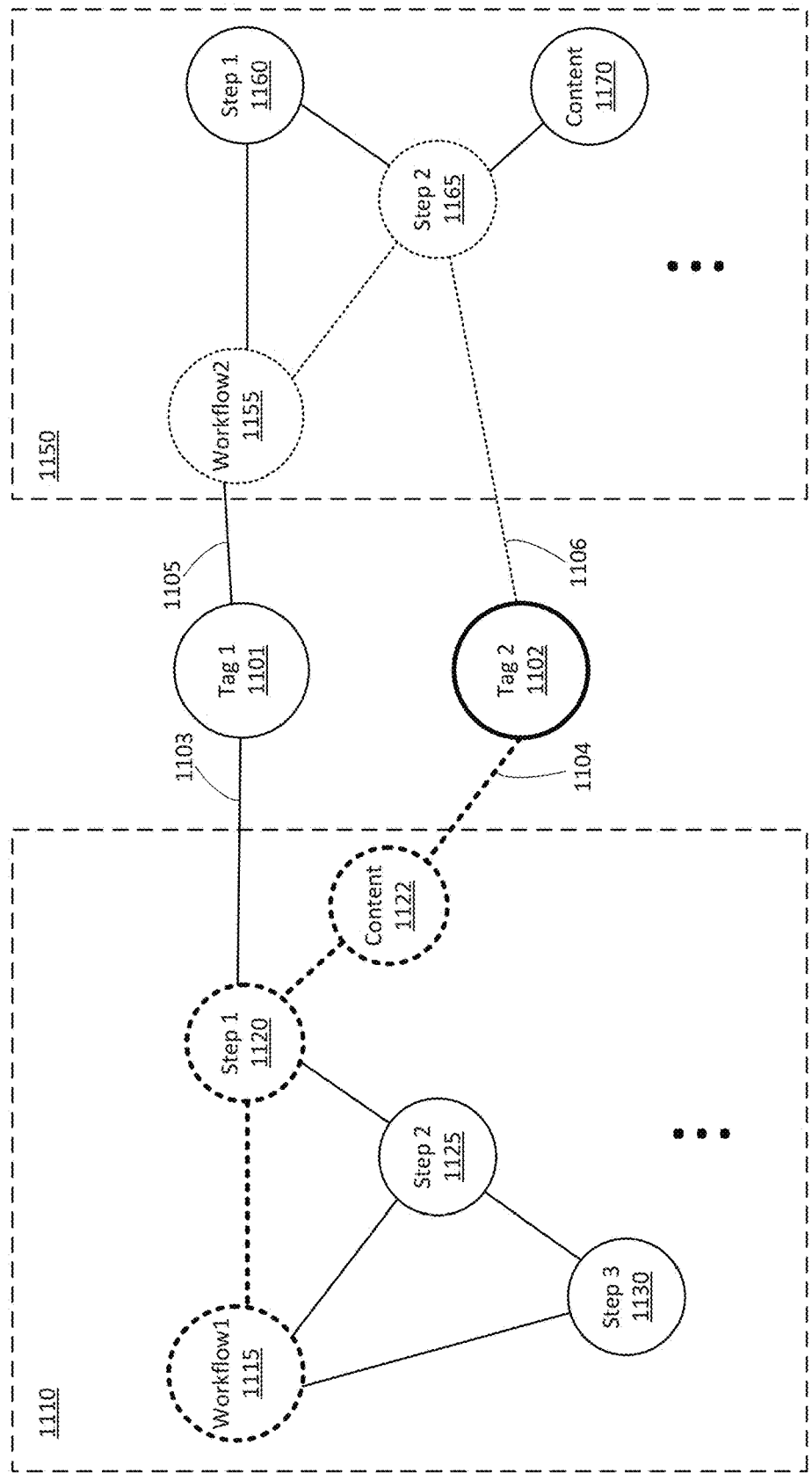
FIG. 14 illustrates a conceptual diagram of a search process based on the database taxonomy of FIG. 11, according to various embodiments.

FIG. 14 illustrates a conceptual diagram of a search process based on the database taxonomy 851 illustrated in FIG. 11, according to various embodiments. FIG. 14 shows some components similar to components shown in FIG. 11 and are not discussed in detail here. In the example of FIG. 14, the received search tag matches the second tag represented by the second tag node 1102 of the database taxonomy 851. Therefore the search service 814 begins the search process at the second tag node 1102 (indicated by the bold node in FIG. 14). The search service 814 then begins a traversing process at each work item node linked to the second tag node 1102. A first traversing process (indicated by the bold dashed nodes and lines in FIG. 14) may begin at the content node 1122 that is linked to the second tag node 1102 by the second linking edge 1104. The search service 814 traverses work item nodes connected to the content node 1122 to identify other relevant work item nodes. For the content node 1122 (representing content associated with a first step of the first client workflow), relevant nodes include the first step node 1120 (representing the first step of the first client workflow) and the workflow node 1115 (representing the first client workflow). When traversing the work item nodes, the search service 814 may collect information for each relevant work item node. A second traversing process (indicated by the dashed nodes and lines in FIG. 14) may begin at the second step node 1165 that is linked to the second tag node 1102 by the fourth linking edge 1106. The search service 814 traverses work item nodes connected to the second step node 1165 to identify other relevant work item nodes. For the second step node 1165 (representing a second step of the second client workflow), a relevant node includes the workflow node 1155 (representing the second client workflow). When traversing the work item nodes, the search service 814 may collect information for each relevant work item node.

Based on the information collected for the relevant work item nodes, the database engine 117 then produces and sends a set of search results (at step 1325) to the search service 814. The set of search results may include, for each relevant work item node, the type of work item that the node represents (such as overall workflow, step, or associated content). The set of search results may also include the information collected for each relevant work item node, such as the author, title, and/or brief description. The set of search results may also include, for each relevant step node representing a step, the information for the workflow that contains the step. The set of search results may further include, for each relevant content node representing content associated with a step of a workflow, the information for the step and the workflow that contains the step.

The search service 814 then receives (at step 1330) the set of search results and sends the set of search results to the client interface 132. The client interface 132 receives and displays (at step 1335) the set of search results to the user. The client interface 132 then receives (at step 1340) a user input requesting a particular database workflow 118 (corresponding to a previously created client workflow 134) listed in the set of search results and sends a client request for the desired database workflow 118 to the presentation service 114. The method 1300 may then continue at step 620 of FIG. 6 to retrieve and presenting the requested database workflow 118.

In sum, an authoring platform 100 is provided for authoring a workflow comprising a sequence of steps for performing a process. An author/user may create a client workflow 134 through interactions with a client interface 132, the client workflow 134 comprising an arrangement of connected geometric shapes 210, the geometric shapes 210 representing steps of the workflow and the connections 220 representing relationships between the shapes/steps. Content may be associated with one or more shapes/steps 210 of the client workflow 134. The associated content may comprise a wide range of content, including online content retrieved from an online resource via a network 120. An authoring service 112 executing on a server computer 110 receives user interactions for creating or modifying the client workflow 134 from the client interface 132 via the network 120. The authoring service 112 translates the received user interactions to a set of database query statements that cause and direct a database engine 117 of the database 116 to store or modify the client workflow 134 as a database workflow 118. The database engine 117 receives and executes the set of database query statements to create or modify the database workflow 118. The database workflow 118 may comprise a graph structure that represents the client workflow 134 as an arrangement of nodes and edges, the nodes representing steps of the client workflow 134 and the edges representing relationships between the steps. A client workflow 132 that is created by the authoring platform 100 and stored to the database 116 as a corresponding database workflow 118 may be later retrieved from the database 116 and displayed at a client interface 132. A database workflow 118 stored to the database 116 may be accessed by any client computer 130 executing a client interface 132 via the network 120. Thus, the authoring platform 100 enables web-based authoring and access to database workflows 118 that allows broad collaboration and distribution of the database workflows 118.

At least one advantage of the disclosed technique is that it enables authoring of workflows that may include a wide range of content, including online content. Another advantage of the disclosed technique is that it enables efficient storing and retrieval of workflows using a graph database.

In sum, an authoring and search platform is provided for creating and searching workflows using a taxonomy of tags. A database taxonomy comprises an arrangement of tag nodes and edges, the tag nodes representing tags of the taxonomy and the edges representing relationships between the tag nodes (such as parent-child relationships). A simplified version of the database taxonomy (client taxonomy) may be loaded to a client computer. An author may interact with a client interface to create or modify a client workflow wherein at least a first tag is received and linked to at least a first workflow item. The client interface sends client payloads to the server computer representing the client workflow and the first tag linked to the first workflow item. The server computer produces query statements that direct the graph database to store the client workflow as a database workflow and link a first node in the database workflow representing the first workflow item to a first tag node in the database taxonomy representing the first tag. This process may be repeated to receive additional tags linked to additional workflow items in the client workflow, which causes additional nodes in the database workflow to be linked to additional nodes in the database taxonomy within the graph database. A plurality of workflows may be created in a similar manner to link the plurality of workflows to the database taxonomy in the graph database. The created and linked workflows may be searched by implementing the database taxonomy stored to the graph database.

At least one advantage of the disclosed technique is that fast and efficient searches of a large number of workflows linked to a taxonomy of tags may be performed.

Figure 15:
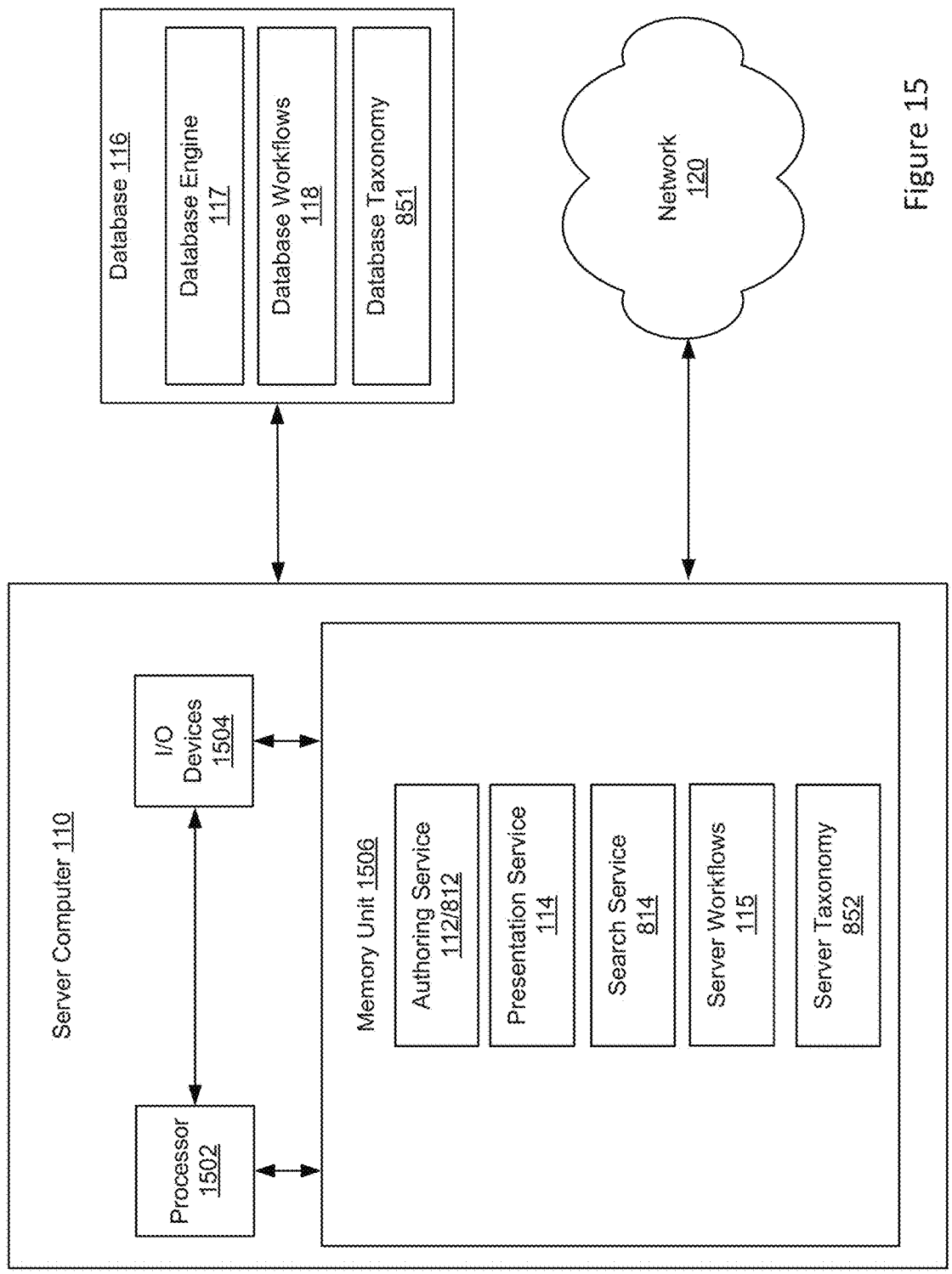
FIG. 15 illustrates an example server computer of FIGS. 1 and 8, according to various embodiments.

FIG. 15 illustrates an example server computer 110 of FIGS. 1 and 8, according to various embodiments. The server computer 110 comprises at least one processor 1502 coupled to input/output (I/O) devices 1504 and to a memory unit 1506. The server computer 110 is coupled to a graph database 116 comprising a database engine 117 that organizes and stores database workflows 118 and at least one database taxonomy 851. The server computer 110 is also coupled to a network 120 via a network interface (not shown). The network 120 may comprise any technically feasible communications or information network, wired or wireless, that allows data exchange, such as a wide area network (WAN), a local area network (LAN), a wireless (Wi-Fi) network, and/or the Internet, among others.

Processor 1502 may be a central processor (CPU), a graphics processor (GPU), an application-specific integrated circuit (ASIC), a field-programmable gate array (FPGA), and so forth. Processor 1502 may also be a combination of different processors, such as a CPU configured to operate in conjunction with a GPU, or many CPUs configured to work together through cloud computing. In general, processor 1502 may be any technically feasible processing device or hardware unit capable of processing data and executing software applications and program code. The processor 1502 executes the software and performs the functions and operations set forth in the embodiments described herein.

Memory 1506 is configured to store software application(s) and data. Instructions from the software constructs within the memory 1506 are executed by processors 1502 to enable the inventive operations and functions described herein. Memory 1506 may include a hard disk, a random access memory (RAM) module, a flash memory unit, or any other type of memory unit or combination thereof. Processor 1502 and I/O devices 1504 are configured to read data from and write data to memory 1506. The memory 1506 may store an authoring service engine 112 and 812, presentation service engine 114, search service engine 814, at least one server workflow 115, and at least one server taxonomy 852.

I/O devices 1504 are also coupled to memory 1506 and may include devices capable of receiving input, such as a keyboard, a mouse, a trackball, and so forth, as well as devices capable of providing output, such as a display, speaker, and so forth, Additionally, I/O devices may include devices capable of both receiving input and providing output, such as a touchscreen, a universal serial bus (USB) port, and so forth.

FIG. 16 illustrates an example client computer 130 of FIGS. 1 and 8, according to various embodiments. The client computer 130 may be a workstation, a laptop computer, a tablet, hand-held or mobile device, or any other device capable of performing embodiments described herein. The client computer 130 comprises at least one processor 1602 coupled to input/output (I/O) devices 1604 and to a memory unit 1606. The client computer 130 is also coupled to a network 120 via a network interface (not shown).

Processor 1602 may be a central processor (CPU), a graphics processor (GPU), an application-specific integrated circuit (ASIC), a field-programmable gate array (FPGA), and so forth. Processor 1602 may also be a combination of different processors, such as a CPU configured to operate in conjunction with a GPU, or many CPUs configured to work together through cloud computing. In general, processor 1602 may be any technically feasible processing device or hardware unit capable of processing data and executing software applications and program code. The processor 1602 executes the software and performs the functions and operations set forth in the embodiments described herein.

Memory 1606 is configured to store software application(s) and data. Instructions from the software constructs within the memory 1606 are executed by processors 1602 to enable the inventive operations and functions described herein. Memory 1606 may include a hard disk, a random access memory (RAM) module, a flash memory unit, or any other type of memory unit or combination thereof. Processor 1602 and I/O devices 1604 are configured to read data from and write data to memory 1606. The memory 1606 may store a client interface engine 132, at least one client workflow 132, and at least one client taxonomy 853.

I/O devices 1604 are also coupled to memory 1606 and may include devices capable of receiving input from an end-user, such as a keyboard, a mouse, a trackball, and so forth, as well as devices capable of providing output to an end-user, such as a display, speaker, and so forth. Additionally, I/O devices may include devices capable of both receiving input and providing output, such as a touchscreen, a universal serial bus (USB) port, and so forth. In particular, the I/O devices may further include a display monitor that displays the client interface 132, client workflows 132, and client taxonomy 853.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. Terms such as "first" and "second" (e.g., first work item, second work item) are used to indicate particular instances and do not indicate a sequential ordering unless specifically stated.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for authoring a workflow, the method comprising:
   receiving, at a server computer, a client workflow comprising an arrangement of shapes and connections, each shape representing a step of the client workflow and each connection representing a relationship between two steps of the client workflow;
   generating, at the server computer, a set of database queries for producing a database workflow corresponding to the client workflow, the database workflow comprising an arrangement of step nodes and step edges, each step node representing a step of the client workflow and each step edge representing a relationship between two steps of the client workflow; and
   sending the set of database queries to a graph database for execution.

2. The computer-implemented method of claim 1, wherein the client workflow is received from a web-based client interface via a network.

3. The computer-implemented method of claim 1, further comprising receiving, at the server computer, online content associated with at least one step of the client workflow.

4. The computer-implemented method of claim 3, wherein the online content comprises content retrieved from an online resource specified by a URL.

5. The computer-implemented method of claim 4, wherein the content is retrieved from the online resource through a service that extracts metadata from the online resource.

6. The computer-implemented method of claim 1, wherein:
   the connections in the client workflow indicate a sequential ordering of the steps included in the client workflow; and
   the edges in the database workflow indicate a sequential ordering of the steps included in the database workflow.

7. The computer-implemented method of claim 1, further comprising:
   receiving, at the server computer, a client request for the database workflow stored to the graph database;
   producing, at the server computer, a database query for retrieving the database workflow; and
   sending the database query for the database workflow to the graph database for retrieving the database workflow.

8. The computer-implemented method of claim 7, further comprising:
   receiving, at the server computer, a graph representation of the database workflow from the graph database;
   producing, at the server computer, a client representation of the database workflow based on the graph representation; and
   sending the client representation to the client interface, wherein the client interface displays the client representation of the database workflow.

9. The computer-implemented method of claim 8, further comprising:
   receiving, at the server computer, a client request for first content associated with a step included in the client workflow;
   producing, at the server computer, a database query for the first content;
   sending the database query for the first content to the graph database;
   receiving, at the server computer, a representation of the first content from the graph database;
   producing, at the server computer, a client representation of the first content based on the representation of the content received from the graph database; and
   sending the client representation of the first content to the client interface, wherein the client interface displays the client representation of the first content.

10. A non-transitory computer-readable medium storing program instructions that, when executed by a processor, cause the processor to author a workflow by performing the steps of:
   receiving, at a server computer, a client workflow comprising an arrangement of shapes and connections, each shape representing a step of the client workflow and each connection representing a relationship between two steps of the client workflow;
   generating, at the server computer, a set of database queries for producing a database workflow corresponding to the client workflow, the database workflow comprising an arrangement of step nodes and step edges, each step node representing a step of the client workflow and each step edge representing a relationship between two steps of the client workflow; and sending the set of database queries to a graph database for execution.

11. The non-transitory computer-readable medium of claim 10, wherein the client interface comprises a web-browser for connecting with the server computer via a network and a workflow editor for creating the client workflow.

12. The non-transitory computer-readable medium of claim 10, further comprising:
receiving, at the server computer, online content associated with at least one step of the client workflow.

13. The non-transitory computer-readable medium of claim 12, wherein the associated online content comprises multimedia content, an image, a website, a tutorial, a blog, or a discussion forum.

14. The non-transitory computer-readable medium of claim 12, further comprising:
producing a set of database queries for producing a content node and content edge in the database workflow, the content node representing the associated content and the content edge representing an associated relationship between the content node and a step node representing the at least one step of the client workflow.

15. The non-transitory computer-readable medium of claim 10, wherein receiving the client workflow comprises receiving a plurality of client payloads representing a plurality of interactions with the client workflow, each client payload representing a particular interaction with the client workflow.

16. The non-transitory computer-readable medium of claim 15, wherein at least one client payload represents a modification of the client workflow, the method further comprising:
producing, at the server computer, a set of database queries for the at least one client payload to modify the database workflow based on the modification of the client workflow; and
sending the set of database queries to the graph database.

17. The non-transitory computer-readable medium of claim 16, wherein:
the at least one client payload is received automatically in response to the modification of the client workflow; and
the set of database queries for the at least one client payload is produced automatically to modify the database workflow based on the modification of the client workflow in real-time.

18. The non-transitory computer-readable medium of claim 15, wherein a client payload is not executable by the graph database.

19. A system configured for authoring a workflow, comprising:
a memory that includes an authoring service engine; and
a processor that is coupled to the memory and, upon executing the authoring service engine, is configured to:
receive a client workflow comprising an arrangement of shapes and connections, each shape representing a step of the client workflow and each connection representing a relationship between two steps of the client workflow;
generate a set of database queries for producing a database workflow corresponding to the client workflow, the database workflow comprising an arrangement of step nodes and step edges, each step node representing a step of the client workflow and each step edge representing a relationship between two steps of the client workflow; and
send the set of database queries to a graph database for execution.

20. The system of claim 19, further comprising:
a graph database for receiving the set of database queries and producing and storing the database workflow.

* * * * *